(12) United States Patent
Rad et al.

(10) Patent No.: US 10,325,351 B2
(45) Date of Patent: Jun. 18, 2019

(54) SYSTEMS AND METHODS FOR NORMALIZING AN IMAGE

(71) Applicant: QUALCOMM Incorporated, San Diego, CA (US)

(72) Inventors: Mahdi Rad, Graz (AT); Markus Oberweger, Graz (AT); Vincent Lepetit, Graz (AT)

(73) Assignee: QUALCOMM Technologies, Inc., San Diego, CA (US)

( * ) Notice: Subject to any disclaimer, the term of this patent is extended or adjusted under 35 U.S.C. 154(b) by 320 days.

(21) Appl. No.: 15/207,239

(22) Filed: Jul. 11, 2016

(65) Prior Publication Data

US 2017/0262962 A1    Sep. 14, 2017

Related U.S. Application Data

(60) Provisional application No. 62/307,225, filed on Mar. 11, 2016.

(51) Int. Cl.
| | |
|---|---|
| *G06K 9/46* | (2006.01) |
| *G06N 3/04* | (2006.01) |
| *G06N 3/08* | (2006.01) |
| *G06T 3/40* | (2006.01) |
| *G06T 5/00* | (2006.01) |
| *G06T 5/20* | (2006.01) |

(Continued)

(52) U.S. Cl.
CPC ............ *G06T 3/4046* (2013.01); *G06F 17/18* (2013.01); *G06K 9/4628* (2013.01); *G06K 9/4661* (2013.01); *G06N 3/04* (2013.01); *G06N 3/08* (2013.01); *G06T 5/007* (2013.01); *G06T 5/008* (2013.01); *G06T 5/20* (2013.01); *G06T 15/506* (2013.01); *H04N 1/6005* (2013.01); *H04N 1/6008* (2013.01); *G06T 2207/10024* (2013.01); *G06T 2207/20021* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 8,311,272 B2 | 11/2012 | Matsugu et al. | |
| 8,463,025 B2 | 6/2013 | Melvin et al. | |

(Continued)

OTHER PUBLICATIONS

Alex Krizhevsky, et al., "ImageNet Classification with Deep Convolutional Neural Networks", Advances in Neural Information Processing Systems 25, 9 pp., (2012).

(Continued)

*Primary Examiner* — Manav Seth
*Assistant Examiner* — David Perlman
(74) *Attorney, Agent, or Firm* — Austin Rapp & Hardman, P.C.

(57) ABSTRACT

A method for normalizing an image by an electronic device is described. The method includes obtaining an image including a target object. The method also includes determining a set of windows of the image. The method further includes, for each window of the set of windows of the image, predicting parameters of an illumination normalization model adapted to the window using a first convolutional neural network (CNN), and applying the illumination normalization model to the window to produce a normalized window.

30 Claims, 19 Drawing Sheets

(51) Int. Cl.
H04N 1/60 (2006.01)
G06F 17/18 (2006.01)
G06T 15/50 (2011.01)

(56) References Cited

U.S. PATENT DOCUMENTS

2007/0297652 A1* 12/2007 Nishiyama ......... G06K 9/00255
 382/118
2015/0178383 A1 6/2015 Corrado et al.
2016/0035078 A1 2/2016 Lin et al.

OTHER PUBLICATIONS

Calonder M., et al., "BRIEF: Computing a Local Binary Descriptor Very Fast," IEEE Transactions on Pattern Analysis and Machine Intelligence, vol. 34, No. 7, 2012, pp. 1281-1298.
Crivellaro A., et al., "A Novel Representation of Parts for Accurate 3D Object Detection and Tracking in Monocular Images", IEEE International Conference on Computer Vision(ICCV), 2015, 9 pages.
Dalal N., et al., "Histograms of oriented gradients for human detection", Computer Vision and Pattern Recognition, 2005 IEEE Computer Society Conference on, IEEE, Piscataway, NJ, USA, Jun. 25, 2005 (Jun. 25, 2005), pp. 886-893 vol. 1, XP031330347, ISBN: 978-0-7695-2372-9 Section 6.3.
Dayan P., et al., "Theoretical Neuroscience: Computational and Mathematical Modeling of Neural Systems", Triliteral, Dec. 17, 2000, 447 pages.
Donahue J., et al., "DeCAF: A Deep Convolutional Activation Feature for Generic Visual Recognition", International Conference on Machine Learning, 2013, 10 Pages.
Geusebroek J-M., et al., "The Amsterdam Library of Object Images", International Journal of Computer Vision, 2005, vol. 61, No. 1, pp. 103-112.
Gross R., et al., "Multi-Pie", Image and Vision Computing, 2010, pp. 807-813.
Jarrett K., et al., "What is the Best Multi-Stage Architecture for Object Recognition?", IEEE 12th International Conference on Computer Visio, 2009, 8 pages.
Lecun Y., et al., "Gradient-Based Learning Applied to Document Recognition", Proceedings of the IEEE, Nov. 1998, pp. 1-46.
Lecun Y., et al., "Learning Methods for Generic Object Recognition with Invariance to Pose and Lighting", Conference on Computer Vision and Pattern Recognition, 2004, 8 pages.
Levi K., et al., "Learning Object Detection from a Small Number of Examples: the Importance of Good Features", Proceedings of the IEEE Computer Society Conference on Computer Vision and Pattern Recognition (CVPR'04), Jun. 27, 2004, 8 pages.
Lowe, D.G., "Distinctive Image Features from Scale-Invariant Keypoints," International Journal of Computer Vision, Jan. 5, 2004, 28 pp.
Malinowski M., at al., "Learning Smooth Pooling Regions for Visual Recognition", British Machine Vision Conference, 2013, 11 pages.
Nayar S.K., et al., "Parametric Appearance Representation", Early Visual Learning, Oxford University Press, 1996, pp. 131-160.
Ojala T., et al., "Gray-Scale and Rotation Invariant Texture Classification with Local Binary Patterns", IEEE Transactions on Pattern Analysis and Machine Intelligence, Jul. 2002, vol. 24. No. 7, pp. 971-987.
Pizer S.M., et al., "Adaptive Histogram Equalization and its Variations", Computer Vision, Graphics, and Image Processing, 1987, vol. 39, Issue 3, pp. 355-368.
Ranzato M.A., et al., "Unsupervised learning of invariant feature hierarchies with applications to object recognition", Proceedings of the 2007 IEEE Conference on Computer Vision and Pattern Recognition (CVPR'07), Jun. 18, 2007 (Jul. 18, 2007), XP031114414, DOI : 10.1109/CVPR.2007.383157 figure 2.
Rigamonti R., et al., "Are Sparse Representations Really Relevant for Image Classification?", Conference on Computer Vision and Pattern Recognition, 2011, pp. 1545-1552.
Rozantsev A., et al., "On Rendering Synthetic Images for Training an Object Detector", Computer Vision and Image Understanding, 2015, 30 pages.
Shen J., et al., "Intrinsic Images using Optimization", Conference on Computer Vision and Pattern Recognition, 2011, pp. 3481-3487.
Shen L., et al., "Intrinsic Image Decomposition Using a Sparse Representation of Reflectance", IEEE Transactions on Pattern Analysis and Machine Intelligence, 2013, vol. 35, No. 12, pp. 2904-2915.
Simonyan K., et al., "Very Deep Convolutional Networks for Large-Scale Image Recognition", International Conference for Learning Representations, 2015, 14 pages.
Viola P. et al., "Robust Real-Time Face Detection", International Journal of Computer Vision, 57(2), 2004, pp. 137-154.
Zhang N., et al., "Pose Pooling Kernels for Sub-Category Recognition", Conference on Computer Vision and Pattern Recognition, 2012, 8 pages.
Zhou T., et al., "Learning Data-driven Reflectance Priors for Intrinsic Image Decomposition", International Conference on Computer Vision, 2015, 9 pages.
Tang Y., et al., "Deep Lambertian Networks", 2012, XP055326803, 8 Pages, Retrieved from the Internet: URL:http://www.cs.toronto.edu/-fritz/absps/dln.pdf.
Choi Y., et al., "Two-Step Learning of Deep Convolutional Neural Network for Discriminative Face Recognition Under Varying Illumination", Electronic Imaging, Imaging and Multimedia Analytics in a Web and Mobile World, vol. 2816, No. 11, Feb. 14, 2016 (Feb. 14, 2016), XP055363231, pp. 1-5.
Cirean D., et al., "Multi-Column Deep Neural Networks for Image Classification", Feb. 13, 2012 (Feb. 13, 2012), XP055363463, Retrieved from the Internet: URL: https://arxiv.orgfpdf/1202.2745.pdf.
International Search Report and Written Opinion—PCT/US2017/012726—ISA/EPO—Apr. 20, 2017.
Lee C-H., et al., "Adaptive Multiscale Retinex for Image Contrast Enhancement", 2013 International Conference on Signal-Image Technology & Internet-Based Systems (SITIS), Dec. 1, 2013 (Dec. 1, 2013), XP055363461, pp. 43-50.
Qifu Z., et al., "Biological Weight Selection of Multi-Scale Retinex Via Artificial Bee Colony Algorithm", Optik, vol. 125, No. 3, 2014, XP028787590, pp. 1434-1438.
Wang X., et al., "Deep Joint Task Learning for Generic Object Extraction", arxiv.org, Cornell University Library, 201 Olin Library Cornell University Ithaca, NY, 14853, Feb. 3, 2015 (Feb. 3, 2015), XP080675788.
Yanming G., et al., "Deep Learning for Visual Understanding: A review", Neurocomputing, Elsevier, Amsterdam, NL, vol. 187, Nov. 26, 2015 (Nov. 26, 2015), XP029484736, pp. 27-48.

* cited by examiner

SYSTEMS AND METHODS FOR NORMALIZING AN IMAGE

RELATED APPLICATION

This application is related to and claims priority to U.S. Provisional Patent Application Ser. No. 62/307,225, filed Mar. 11, 2016, for "SYSTEMS AND METHODS FOR DETECTING A TARGET OBJECT."

FIELD OF DISCLOSURE

The present disclosure relates generally to electronic devices. More specifically, the present disclosure relates to systems and methods for normalizing an image.

BACKGROUND

Some electronic devices (e.g., cameras, video camcorders, digital cameras, cellular phones, smart phones, computers, televisions, automobiles, personal cameras, action cameras, surveillance cameras, mounted cameras, connected cameras, robots, drones, smart applications, healthcare equipment, set-top boxes, etc.) capture and/or utilize images. For example, a smartphone may capture and/or process still and/or video images. Processing images may demand a relatively large amount of time, processing, memory, and energy resources. The resources demanded may vary in accordance with the complexity of the processing.

Images may vary widely in their characteristics. For example, different images may vary widely in illumination, in the number and kinds of objects shown in the images, in the textures and structures shown in the images, etc. Because of the wide variety in image characteristics, consistent image processing may be difficult to achieve. As can be observed from this discussion, systems and methods that improve image processing may be beneficial.

SUMMARY

A method for normalizing an image by an electronic device is described. The method includes obtaining an image including a target object. The method also includes determining a set of windows of the image. The method additionally includes, for each window of the set of windows of the image, predicting parameters of an illumination normalization model adapted to the window using a first convolutional neural network (CNN). The method further includes, for each window of the set of windows of the image, applying the illumination normalization model to the window to produce a normalized window. Applying the illumination normalization model to a window may include convolving a convolutional filter with the window.

The method may include, for each window of the set of windows of the image, analyzing the normalized window with a second CNN for scoring the normalized window. The method may include detecting the target object in a normalized window with a largest score. The first CNN and the second CNN may be jointly trained CNNs.

The first CNN may be a normalizer CNN and the second CNN may be a detector CNN. The first CNN may be trained for predicting parameters of the illumination normalization model based on a set of training images. A subset of the set of training images may include a training target object. The second CNN may be trained for detecting the training target object based on the set of training images and the illumination normalization model. The first CNN and the second CNN may be trained based on minimizing a joint loss function.

Predicting the parameters may include predicting a set of weights respectively applied to a set of Gaussian filters to obtain a convolutional filter. The method may include determining a predicted weight matrix based on the predicted parameters for each window. The method may also include normalizing the image based on the predicted weight matrix to produce a normalized image.

The image may be a color image. The method may include transforming the color image to produce a lightness channel and a color channel. The method may also include normalizing the lightness channel to produce a normalized lightness channel. The method may further include transforming the normalized lightness channel and the color channel to an original color space.

An electronic device for normalizing an image is also described. The electronic device includes a processor. The processor is be configured to obtain an image including a target object. The processor is also configured to determine a set of windows of the image. The processor is further configured to, for each window of the set of windows of the image, predict parameters of an illumination normalization model adapted to the window using a first convolutional neural network (CNN). The processor is additionally configured to, for each window of the set of windows of the image, apply the illumination normalization model to the window to produce a normalized window.

An apparatus for normalizing an image is also described. The apparatus includes means for obtaining an image including a target object. The apparatus also includes means for determining a set of windows of the image. The apparatus further includes means for predicting, for each window of the set of windows of the image, parameters of an illumination normalization model adapted to the window using a first convolutional neural network (CNN). The apparatus additionally includes means for applying, for each window of the set of windows of the image, the illumination normalization model to the window to produce a normalized window.

A computer-program product for normalizing an image is also described. The computer-program product includes a non-transitory computer-readable medium with instructions. The instructions include code for causing an electronic device to obtain an image including a target object. The instructions also include code for causing the electronic device to determine a set of windows of the image. The instructions further include code for causing the electronic device to predict, for each window of the set of windows of the image, parameters of an illumination normalization model adapted to the window using a first convolutional neural network (CNN). The instructions additionally include code for causing the electronic device to apply, for each window of the set of windows of the image, the illumination normalization model to the window to produce a normalized window.

A method for training convolutional neural networks (CNNs) by an electronic device is also described. The method includes obtaining a set of images. A subset of the set of images includes a target object. The method also includes training a first convolutional neural network (CNN) for predicting parameters of an illumination normalization model based on the set of images. The method further includes training a second CNN for detecting the target object based on the set of images and the illumination normalization model.

The first CNN and the second CNN may be trained jointly. Training the first CNN and the second CNN may be based on minimizing a joint loss function. The method may include training a third CNN for a second target object based on the illumination normalization model.

An electronic device for training convolutional neural networks (CNNs) is also described. The electronic device includes a processor. The processor is configured to obtain a set of images. A subset of the set of images includes a target object. The processor is also configured to train a first convolutional neural network (CNN) for predicting parameters of an illumination normalization model based on the set of images. The processor is further configured to train a second CNN for detecting the target object based on the set of images and the illumination normalization model.

An apparatus for training convolutional neural networks (CNNs) is also described. The apparatus includes means for obtaining a set of images. A subset of the set of images includes a target object. The apparatus also includes means for training a first convolutional neural network (CNN) for predicting parameters of an illumination normalization model based on the set of images. The apparatus further includes means for training a second CNN for detecting the target object based on the set of images and the illumination normalization model.

A computer-program product for training convolutional neural networks (CNNs) is also described. The computer-program product includes a non-transitory tangible computer-readable medium with instructions. The instructions include code for causing an electronic device to obtain a set of images. A subset of the set of images includes a target object. The instructions also include code for causing the electronic device to train a first convolutional neural network (CNN) for predicting parameters of an illumination normalization model based on the set of images. The instructions further include code for causing the electronic device to train a second CNN for detecting the target object based on the set of images and the illumination normalization model.

DETAILED DESCRIPTION

Figure 1:
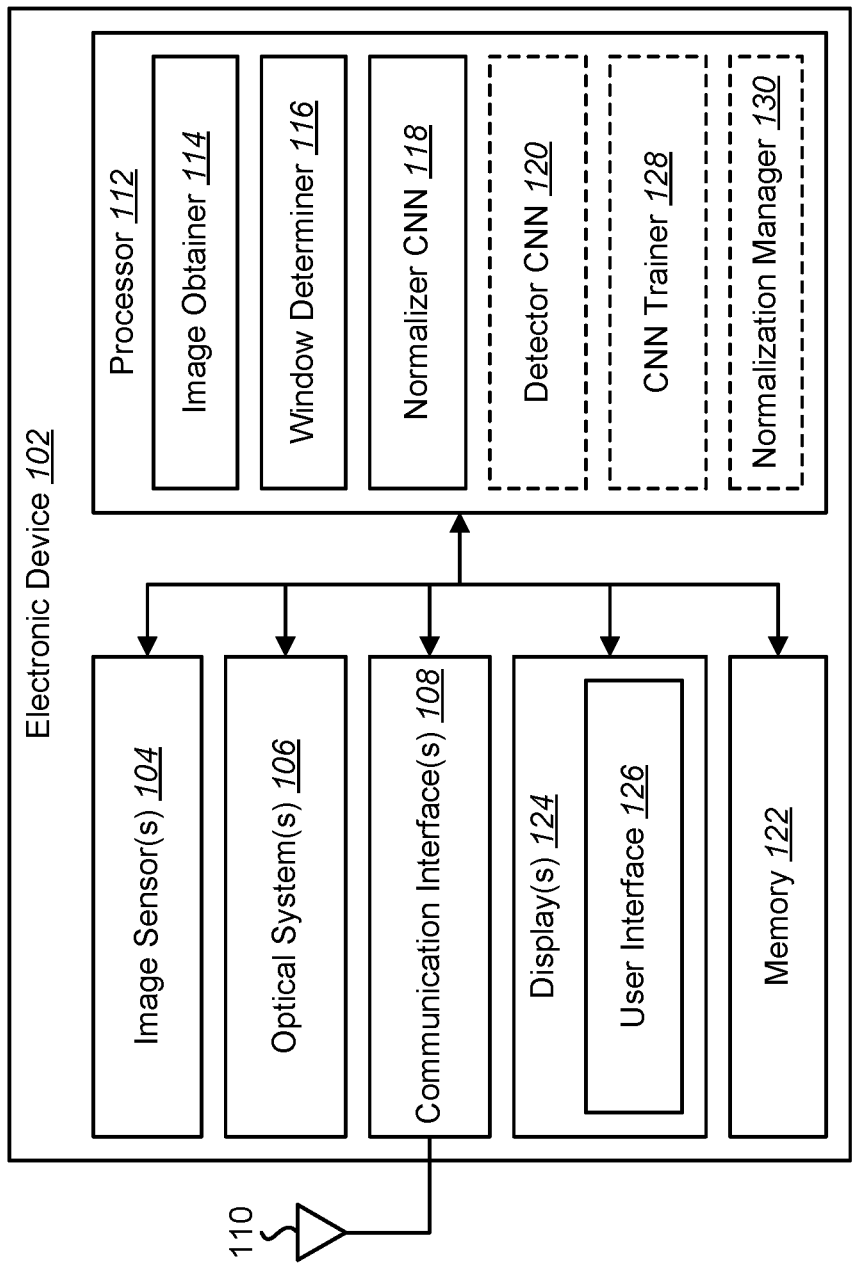
FIG. 1 is a block diagram illustrating one example of an electronic device in which systems and methods for normalizing an image may be implemented.

Some configurations of the systems and methods disclosed herein may relate to normalizing illumination (e.g., contrast) of an image. For example, some configurations of the systems and methods disclosed herein may provide an adaptive image normalization approach (e.g., adaptive local contrast normalization) that makes object detection more robust to illumination changes, without requiring large amounts of training data. In some configurations, the systems and methods disclosed herein may improve the robustness of object detection with automated retina normalization.

One problem that may arise is, given a single or very few training images of an object, how can the object be reliably detected in other images with different illumination conditions? This is an important problem for example in robotics and augmented reality applications, where lighting may not be controlled. Capturing many training images under different illuminations may become too cumbersome or even impossible. Some approaches to the problem may use illumination normalization. In order to be robust to light changes, for instance, pre-processing the images may be used to normalize the input images. However, some examples of illumination normalization may utilize parameters for normalization that are fixed by hand on a validation set, which may limit robustness to light changes. More specifically, some of these examples may amplify image noise, and have fixed tuned parameters that fail to work over large ranges of illumination conditions. For example, different architectures have been evaluated in an attempt to get the best architecture for the object recognition problem. However, these architectures used some fixed parameters for Local Contrast Normalization (LCN).

One aspect of the systems and methods disclosed herein may include adapting the normalization parameters to the input image. This may be accomplished with a Convolutional Neural Network (CNN) trained to predict the parameters of an extension of a Difference-of-Gaussians approach. Moreover, this CNN (which may be referred to as a "normalizer CNN") may be universally applicable. For example, the normalizer CNN may not need to be re-trained for each new target object.

Object detection and recognition have improved over the last few years, in particular thanks to the development of Convolutional Neural Networks (CNNs). So far, efforts have been mainly focused on object category recognition in photographs, when images are typically of reasonable good quality, and large amounts of training data are easily available. In other applications, such as robotics and augmented reality, the capture conditions are much less controlled, and creating large amounts of training data may be cumbersome or even impossible in some cases. In these conditions, a contrast normalization technique may be utilized, such as Local Contrast Normalization (LCN), Difference-of-Gaussians (DoG), or histogram normalization. Some of these approaches may fail when dealing with large ranges of illumination changes.

Some configurations of the systems and methods disclosed herein may involve an adaptive approach that extends the Difference-of-Gaussians. For example, a normalization convolutional filter may be applied to an input image window (or image patch) to reduce the influence of illumination. This filter may adapt to the image itself, which may be a unique feature of the systems and methods disclosed herein. It may be difficult to predict all the coefficients of a general linear filter. The Difference-of-Gaussians model may indicate a very constrained model. In some configurations, the normalization filter may be modeled as a linear combination of a few 2D Gaussian kernels with various standard deviations. The parameters of this model may be the weights of this linear combination. Modeling the normalization filter as a combination of several 2D Gaussian kernels with various standard deviations, where the parameters of the model are weights of the linear combination, may be a unique feature of the systems and methods disclosed herein.

In some configurations of the systems and methods disclosed herein, a normalizer CNN for predicting these weights from the input image may be jointly trained with a detector CNN (e.g., classifier CNN) for object detection. In some approaches, training may be carried out using synthetic images created with a method from a very small number of real images of a target object (or object of interest). The systems and methods disclosed herein may outperform (by a large margin in some cases) other approaches for illumination normalization. Some configurations of the systems and methods disclosed herein may not require manual tuning. The normalizer CNN may generalize to unseen objects and may predict suitable weights. For example, the normalizer CNN may predict a Difference-of-Gaussians filter while the model for the normalization filter may allow for more general forms. Accordingly, the normalizer CNN may not need to be trained for each different object.

The size of the receptive field of the predicted filter may increase when lighting decreases, which is consistent with the behavior of the cells in the lateral geniculate nucleus (LGN) and in the primary visual cortex (V1 layer). These cells also have receptive fields that vary with illumination to compensate for a low signal-to-noise-ratio. Accordingly, the normalizer CNN may learn and/or exhibit a behavior that resembles closely what is known about the behavior of the visual cortex in terms of contrast normalization.

A general detection scenario may be considered. Given a grayscale input image, a classifier may be applied to the input image in a sliding window fashion to find the windows, if any, that contain the object of interest. Reliable object detection may be required to be invariant to, or at least robust to, many different visual nuisances, including pose and illumination variations. Some approaches for achieving this are described as follows.

One approach relies on the training set. If the training set exhibits enough variations, it can be hoped that the classification method will learn to recognize the target object despite the nuisances.

Another approach relies on image features that are invariant to some nuisance. One way to deal with illumination changes is to normalize the input image using image statistics, for instance by contrast normalization or histogram equalization. However, illumination differences are not necessarily uniform over images. For example, applying one of these approaches locally over regions of the image may handle local light changes better. However, they may also become unstable on poorly textured regions. The systems and methods disclosed herein may overcome this limitation with an adaptive approach that effectively adjusts the normalization according to the local appearance of the image.

In an alternative, locally invariant features may be used for object detection. For example, Haar wavelets and the pairwise intensity comparisons used in Local Binary Patterns may be invariant to monotonic changes of the intensities. Features based on image gradients may be invariant to constants added to the intensities. In practice, they often may also be made invariant to affine changes by normalizing gradient magnitudes over the bins indexed by their orientations. The SIFT descriptors may be additionally normalized by an iterative process that may make them robust to saturation effects as well. However, it may be difficult to come up with features that are invariant to complex illumination changes on 3D objects, such as changes of light direction, cast or self-shadows. Experimental results may confirm that an adaptive approach in accordance with the systems and methods disclosed herein may outperform hand-crafted locally invariant features.

Yet another approach may model illumination explicitly, and estimate an intrinsic image from the input image. This may get rid of the illumination and isolate the reflectance of the scene as an invariant to illumination. However, it may still be difficult to get an intrinsic image from one input image good enough for object recognition.

Discriminative features may be learned with deep networks. For example, a set of convolutional filters may be learned. Some approaches may rely only on a training set to be robust to variations, while some approaches may indicate that local contrast normalization may be beneficial. Some configurations of the systems and methods disclosed herein may employ a learned normalization step that adapts to the input image.

Some approaches for normalization are described as follows. One approach is normalization by standardization, which may be robust to light changes. This approach may include subtracting the mean $\bar{I}$ of the pixel intensities from the input image window I for each pixel intensity, and dividing the result by their standard deviation $\sigma_I$ as shown in Equation (1).

$$I^{GN} = \frac{(I - \bar{I})}{\sigma_I} \quad (1)$$

This transformation may make the resulting image window $I^{GN}$ invariant to affine transformation of the intensities (if saturation effects that clip the intensity values within some interval (typically [0; 255]) are ignored, for example).

Another approach is Difference-of-Gaussians (DoG). The Difference-of-Gaussians may be a bandpass filter used for normalization as illustrated in Equation (2).

$$I^{DoG} = (k_2 \cdot G_{\sigma_2} - k_1 \cdot G_{\sigma_1}) * I \quad (2)$$

In Equation (2), $G_\sigma$ is a two-dimensional (2D) Gaussian filter (e.g., a Gaussian 2D kernel) of standard deviation $\sigma$, $k_1$, $k_2$, $\sigma_1$, and $\sigma_2$ are parameters of the Difference-of-Gaussians, and * is the 2D convolution operator. $k_1$ and $k_2$ are scalar values. This may also be a mathematical model for ON- and OFF-center cells of the retina. In some approaches, Gaussian filters of size [6σ+1] may be utilized, for example. The DoG approach may be inspired by mathematical models for the ON- and OFF-receptors of mammals. The DoG may be a generalized form of subtractive LCN.

Another approach is whitening. Whitening may be utilized for illumination normalization. It is related to DoG, as learned whitening filters computed from natural image patches may resemble a Difference-of-Gaussians. In practice, a whitening matrix W may be computed first as the inverse of the square root of the covariance matrix C of the image patches. The columns of the whitening matrix are all translated versions of the same patch, and the middle column may be used as the whitening convolutional filter.

Another approach is Local Contrast Normalization (LCN). When working with deep networks, LCN may be used. One variant of LCN is subtractive LCN. Subtractive LCN is related to DoG as it subtracts from every value in an image patch a Gaussian-weighted average of its neighbors. For example, subtractive LCN may include applying an operation on an input image I as illustrated in Equation (3).

$$I^{LCN-Sub} = I - G_{\sigma^{Sub}} * I \quad (3)$$

In Equation (3), $G_{\sigma^{sub}}$ is a Gaussian 2D kernel of standard deviation $\sigma^{Sub}$ and * is a 2-dimensional (2D) convolution.

Another variant is divisive LCN. Divisive LCN makes the image invariant to local affine changes by dividing the intensities $I^{LCN-Sub}$ by their standard deviation, computed locally as illustrated in Equation (4).

$$I^{LCN-Div}(m) = \frac{I^{LCN-Sub}(m)}{\max(t, (G_{\sigma^{Div}} * (I^{LCN-Sub})^2)(m))} \quad (4)$$

In Equation (4), $(I^{LCN-Sub})^2$ is an image made of the squared intensities of $I^{LCN-Sub}$, $\sigma^{Div}$ is a parameter controlling the size of the region for the local standard deviation of the intensities, and t is a small value to avoid singularities.

Histogram equalization is another approach. Histogram equalization aims at enhancing the image contrast by better distributing the intensities of the input image. First, a histogram $p(\lambda_1)$ of the image intensities, with any possible quantized intensity value $\lambda_i$, is built. Then, a new intensity $\tilde{\lambda}_i$ is assigned to all the pixels with intensity $\lambda_i$ in accordance with Equation (5).

$$\tilde{\lambda}_i = \lambda_{min} + \text{floor}\left((\lambda_{max} - \lambda_{min})\sum_{j=0}^{i} p(\lambda_j)\right) \quad (5)$$

CLAHE (Contrast Limited Adaptive Histogram Equalization) is another approach. With the previous histogram normalization method, the spatial location of the pixels is not taken into account, and noise tends to be amplified. CLAHE attempts to overcome the limits of histogram equalization by introducing spatial constraints and preventing noise amplification. In CLAHE, histogram equalization is performed locally and the histograms are clipped. For example, if a $p(\lambda_i)$ is higher than a threshold $\hat{\lambda}$, $p(\lambda_i)$ may be set as $p(\lambda_i) = \hat{\lambda}$, and the histogram may be re-normalized.

Intrinsic image is another approach. An intrinsic image of an input image I may be obtained by separating the illumination S from the reflectance R of the scene such that Equation (6) is realized.

$$I(i) = S(i)R(i) \quad (6)$$

In Equation (6), I(i) denotes the value of the i-th pixel of I. Equation (6) is ill-posed, but can still be solved by adding various constraints. Since R is supposed to be free from illumination effects, it can then be used as input instead of the original image to be invariant to illuminations. However, it is still difficult to estimate R robustly. Moreover, optimizing over S and R under constraints is computationally expensive and impractical for real-time applications.

Some normalization techniques either do not perform locally (e.g., normalization by standardization, histogram normalization, etc.) or may use a fixed set of the parameters (e.g. LCN, LRN, etc.). Some techniques may attempt to normalize an output of CNN neurons (e.g., not normalize by determining parameters by a CNN). Some techniques may average the same CNN with different parameters. These techniques may be distinct from some configurations of the systems and methods disclosed herein.

The systems and methods disclosed herein (e.g., an adaptive normalization approach) may outperform the aforementioned techniques for object detection. Some benefits of the systems and methods disclosed herein may include requiring very little amount of learning data and/or running in real time. One advantage of some configurations of the systems and methods disclosed herein is that the contrast normalization is adapted to a local window.

Some configurations of the systems and methods disclosed herein may relate to adaptive local contrast normalization (ALCN). As discussed above, the performance of the approaches described above is still limited. In particular, there are no ideal values for the parameters of LCN and DoG. For example, some values work better for dark images, while others may work better for brighter images.

According to this observation, some configurations of the systems and methods disclosed herein may utilize an approach where normalization may be accomplished by a convolutional filter that depends on the input image. This approach may be referred to as adaptive local contrast normalization (ALCN). It should be noted that some approaches involving DoG and subtractive LCN may rely on a convolutional filter for normalization. However, this filter may be constant. In contrast, a convolutional filter utilized in accordance with ALCN may be adaptive.

Some configurations of the systems and methods disclosed herein may provide a contrast normalization (CN) technique that extends LCN and/or may provide training a retina parameters predictor (e.g., a normalizer CNN) together with a detector (e.g., detector CNN) to normalize each image window (e.g., patch) depending on the window characteristic. The retina parameters predictor may produce retina parameters for a given image to improve the accuracy of the detector. At run-time, the retina parameters predictor (e.g., normalizer CNN) may be applied to the input image first, and then the detector (e.g., a predicted detector) may be applied to a normalized image in order to detect the target object.

In some configurations of the systems and methods disclosed herein, a detection pipeline may include two convolutional neural networks (CNNs). For example, a first CNN may be referred to as a normalizer CNN. A second CNN may be referred to as a detector CNN. The detector CNN may be utilized in object detection. In some configurations, the normalizer CNN may be trained jointly with the detector CNN. Additional details are given herein regarding the normalizer CNN, the detector CNN, and approaches for training one or more CNNs.

As described herein, adaptive local contrast normalization (ALCN) may be utilized to normalize an input image. Some configurations of ALCN may include a first CNN (e.g., a normalizer CNN), which may be jointly trained with a second CNN (e.g., a detector CNN) to normalize each image window depending on its characteristic in order to improve the accuracy of the detector. In some configurations, one or more additional features may be implemented. For example, predicted weights for each image window may be shared at run-time to normalize the input image. This approach may not be limited to grayscale images, and may also be used to normalize color images. For instance, color images may be normalized by normalizing the lightness (L) of the image in Commission Internationale de l'Eclairage (CIE) color space, and adding an ab channel of the original color image.

Various configurations are now described with reference to the Figures, where like reference numbers may indicate functionally similar elements. The systems and methods as generally described and illustrated in the Figures herein may be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one example of an electronic device 102 in which systems and methods for normalizing an image may be implemented. Normalizing an image may include normalizing one or more windows of the image and/or normalizing the entire image. In some configurations, the electronic device 102 may be additionally or alternatively configured to detect a target object in an image and/or to train convolutional neural networks (CNNs). Examples of the electronic device 102 include cameras, video camcorders, digital cameras, cellular phones, smart phones, computers (e.g., desktop computers, laptop computers, servers, etc.), tablet devices, media players, televisions, vehicles, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, aircraft, drones, unmanned aerial vehicles (UAVs), smart appliances, healthcare equipment, gaming consoles, personal digital assistants (PDAs), set-top boxes, appliances, etc. The electronic device 102 may include one or more components or elements. One or more of the components or elements may be implemented in hardware (e.g., circuitry), a combination of hardware and firmware, and/or a combination of hardware and software (e.g., a processor with instructions).

In some configurations, the electronic device 102 may perform one or more of the functions, procedures, methods, steps, etc., described in connection with one or more of FIGS. 1-19. Additionally or alternatively, the electronic device 102 may include one or more of the structures described in connection with one or more of FIGS. 1-19.

In some configurations, the electronic device 102 may include a processor 112, a memory 122, a display 124, one or more image sensors 104, one or more optical systems 106, and/or one or more communication interfaces 108. The processor 112 may be coupled to (e.g., in electronic communication with) the memory 122, display 124, image sensor(s) 104, optical system(s) 106, and/or communication interface(s) 108. It should be noted that one or more of the elements of the electronic device 102 described in connection with FIG. 1 (e.g., image sensor(s) 104, optical system(s) 106, communication interface(s) 108, display(s) 124, etc.), may be optional and/or may not be included (e.g., implemented) in the electronic device 102 in some configurations.

The processor 112 may be a general-purpose single- or multi-chip microprocessor (e.g., an Advanced RISC (reduced instruction set computing) Machine (ARM)), a special-purpose microprocessor (e.g., a digital signal processor (DSP)), a microcontroller, a programmable gate array, etc. The processor 112 may be referred to as a central processing unit (CPU). Although the processor 112 is shown in the electronic device 102, in an alternative configuration, a combination of processors (e.g., an image signal processor (ISP) and an application processor, an ARM and a digital signal processor (DSP), etc.) could be used. The processor 112 may be configured to implement one or more of the methods disclosed herein.

The processor 112 may include and/or implement an image obtainer 114, a window determiner 116, a normalizer CNN 118, a detector CNN 120, a CNN trainer 128, and/or a normalization manager 130. It should be noted that one or more of the image obtainer 114, window determiner 116, normalizer CNN 118, detector CNN 120, CNN trainer 128, and/or normalization manager 130 may not be implemented and/or may be optional in some configurations. For example, the CNN trainer 128 may or may not be implemented in some configurations. In some configurations, the CNN trainer 128 may be implemented for training the normalizer CNN 118 and/or detector CNN 120. This training may be performed offline and/or not during runtime in some configurations. Additionally or alternatively, the electronic device 102 may not train the normalizer CNN 118 and/or the detector CNN 120 in some configurations, but may receive a pre-trained normalizer CNN 118 and/or pre-trained detector CNN 120 in some configurations (and/or may receive pre-trained parameter values for the normalizer CNN 118 and/or the detector CNN 120).

The memory 122 may be any electronic component capable of storing electronic information. For example, the memory 122 may be implemented as random access memory (RAM) (e.g., dynamic random access memory (DRAM)), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The memory 122 may store instructions and/or data. The processor 112 may access (e.g., read from and/or write to) the memory 122. The instructions may be executable by the processor 112 to implement one or more of the methods described herein. Executing the instructions may involve the use of the data that is stored in the memory 122. When the processor 112 executes the instructions, various portions of the instructions may be loaded onto the processor 112 and/or various pieces of data may be loaded onto the processor 112. Examples of instructions and/or data that may be stored by the memory 122 may include image data, image obtainer 114 instructions, window determiner 116 instructions, normalizer CNN 118 instructions, detector CNN 120 instructions and/or CNN trainer 128 instructions, etc. In some configurations, the memory 122 may store CNN parameters (e.g., weights from the normalizer CNN 118, scores from the detector CNN 120, etc.).

The communication interface(s) 108 may enable the electronic device 102 to communicate with one or more other electronic devices. For example, the communication interface(s) 108 may provide one or more interfaces for wired and/or wireless communications. In some configurations, the communication interface(s) 108 may be coupled to one or more antennas 110 for transmitting and/or receiving radio frequency (RF) signals. Additionally or alternatively, the communication interface 108 may enable one or more kinds of wireline (e.g., Universal Serial Bus (USB), Ethernet, Data Over Cable Service Interface Specification (DOCSIS), etc.) communication.

In some configurations, multiple communication interfaces 108 may be implemented and/or utilized. For example, one communication interface 108 may be a cellular (e.g., 3G, Long Term Evolution (LTE), CDMA, etc.) communication interface 108, another communication interface 108 may be an Ethernet interface, another communication interface 108 may be a universal serial bus (USB) interface and yet another communication interface 108 may be a wireless local area network (WLAN) interface (e.g., Institute of Electrical and Electronics Engineers (IEEE) 802.11 interface). In some configurations, the communication interface 108 may send information (e.g., image information, object detection information, normalizer CNN 118 information, detector CNN 120 information, etc.) to and/or receive information from another device (e.g., a vehicle, a smart phone, a camera, a display, a remote server, etc.).

The electronic device 102 (e.g., image obtainer 114) may obtain one or more images (e.g., digital images, image frames, frames, video, captured images, test images, etc.). For example, the electronic device 102 may include the image sensor(s) 104 and the optical system(s) 106 (e.g., lenses) that focus images of scene(s) and/or object(s) that are located within the field of view of the optical system 106 onto the image sensor 104. The optical system(s) 106 may be coupled to and/or controlled by the processor 112 in some configurations. A camera (e.g., a visual spectrum camera or otherwise) may include at least one image sensor and at least one optical system. Accordingly, the electronic device 102 may be one or more cameras and/or may include one or more cameras in some implementations. In some configurations, the image sensor(s) 104 may capture the one or more images (e.g., image frames, video, still images, burst mode images, captured images, test images, etc.).

Additionally or alternatively, the electronic device 102 may request and/or receive the one or more images from another device (e.g., one or more external cameras coupled to the electronic device 102, a network server, traffic camera(s), drop camera(s), vehicle camera(s), web camera(s), etc.). In some configurations, the electronic device 102 may request and/or receive the one or more images (e.g., captured images) via the communication interface 108. For example, the electronic device 102 may or may not include camera(s) (e.g., image sensor(s) 104 and/or optical system(s) 106) and may receive images from one or more remote device(s). One or more of the images (e.g., image frames) may include one or more scene(s) and/or one or more object(s). One or more of the object(s) may be a target object.

In some configurations, the electronic device 102 may include an image data buffer (not shown). The image data buffer may be included in the memory 122 in some configurations. The image data buffer may buffer (e.g., store) image data from the image sensor(s) 104 and/or external camera(s). The buffered image data may be provided to the processor 112.

The display(s) 124 may be integrated into the electronic device 102 and/or may be coupled to the electronic device 102. Examples of the display(s) 124 include liquid crystal display (LCD) screens, light emitting display (LED) screens, organic light emitting display (OLED) screens, plasma screens, cathode ray tube (CRT) screens, etc. In some implementations, the electronic device 102 may be a smartphone with an integrated display. In another example, the electronic device 102 may be linked to one or more remote displays 124 and/or to one or more remote devices that include one or more displays 124.

In some configurations, the electronic device 102 may include a camera software application. When the camera application is running, images of objects that are located within the field of view of the optical system(s) 106 may be captured by the image sensor(s) 104. The images that are being captured by the image sensor(s) 104 may be presented on the display 124. For example, one or more images may be sent to the display(s) 124 for viewing by a user. In some configurations, these images may be played back from the memory 122, which may include image data of an earlier captured scene. The one or more images obtained by the electronic device 102 may be one or more video frames and/or one or more still images. In some configurations, the display(s) 124 may present an image, a normalized image, and/or an object detection result from the processor 112 (e.g., from the detector CNN 120). Additionally or alternatively, the display(s) 124 may present automatically focused images, one or more indicators corresponding to one or more target objects (e.g., detected object(s), object(s) of interest, recognized objects(s), etc.) and/or one or more images (e.g., cropped object(s), zoomed object(s), etc.). For example, the processor 112 may, based on a detected target object, perform automatic zoom, automatic focus, object recognition, and/or other image processing. One or more results of image processing based on a detected target object may be presented on the display(s) 124.

In some configurations, the electronic device 102 may present a user interface 126 on the display 124. For example, the user interface 126 may enable a user to interact with the electronic device 102. In some configurations, the user interface 126 may enable a user to interact with the electronic device 102. For example, the user interface 126 may receive a touch, a mouse click, a gesture, and/or some other indication that indicates an input.

The electronic device 102 (e.g., processor 112) may optionally be coupled to, be part of (e.g., be integrated into), include and/or implement one or more kinds of devices. For example, the electronic device 102 may be implemented in a vehicle or a drone equipped with cameras. In another example, the electronic device 102 (e.g., processor 112) may be implemented in an action camera. In yet another example, the electronic device 102 may be implemented in an augmented reality headset.

The processor 112 may include and/or implement an image obtainer 114. One or more images (e.g., image frames, video, burst shots, captured images, test images, etc.) may be provided to the image obtainer 114. For example, the image obtainer 114 may obtain image frames from one or more image sensors 104. For instance, the image obtainer 114 may receive image data from one or more image sensors 104 and/or from one or more external cameras. As described above, the image(s) (e.g., captured images) may be captured from the image sensor(s) 104 included in the electronic device 102 or may be captured from one or more remote camera(s).

In some configurations, the image obtainer 114 may request and/or receive one or more images (e.g., image frames, etc.). For example, the image obtainer 114 may request and/or receive one or more images from a remote device (e.g., external camera(s), remote server, remote electronic device, etc.) via the communication interface 108.

In some configurations, the image obtainer 114 may generate one or more synthetic images. For example, the image obtainer 114 may obtain a segmented object and may generate one or more synthetic images with varying backgrounds and/or varying illumination. The synthetic image(s) may be utilized for training in some approaches.

In some configurations, the processor 112 may include and/or implement a window determiner 116. The window determiner 116 may determine one or more windows (e.g., patches, subsets, portions, etc.) of one or more images. For example, the processor 112 may determine subsets (e.g., pixel subsets) of one or more images. In some configurations, one or more of the windows may be of a predetermined size (e.g., numbers of pixels in two dimensions). Two or more of the windows may overlap and/or two or more of the windows may be mutually exclusive. Windows may be determined for one or more images. In some configurations, the processor 112 window determiner 116 may utilize a sliding window approach to determine one or more windows of the one or more images. The one or more images and/or one or more windows of the one or more images may be provided to the normalizer CNN 118, to the detector CNN 120, to the CNN trainer 128, and/or to the normalization manager 130.

One or more of the images and/or one or more of the windows may be normalized by the electronic device 102. The processor 112 may include and/or implement a first CNN. This first CNN may be referred to as the normalizer or normalizer CNN 118. The normalizer CNN 118 may normalize one or more images (e.g., one or more windows of one or more images). For example, the normalizer CNN 118 may adjust the illumination, contrast, and/or brightness of an image (and/or one or more windows of the image). The normalizer CNN 118 (which may be referred to as a normalizer) may predict parameters of an illumination normalization model adapted to one or more windows. For example, the normalizer CNN 118 may predict a set of weights. The set of weights may be respectively applied to a set of Gaussian filters to obtain a convolutional filter. More detail is provided in connection with FIG. 3.

The processor 112 may apply the illumination normalization model to one or more windows to produce one or more normalized windows. For example, applying the illumination normalization model to a window may include convolving the convolutional filter with each window of the set of windows. More detail is provided in connection with FIG. 3.

Some configurations of the normalizer CNN 118 may be implemented and/or utilized as follows. The normalizer CNN 118 may be utilized to predict a normalization filter. The normalizer CNN 118 may take an image as an input. In some configurations, an objective of the electronic device 102 may be to determine whether the image contains a target object or not. The normalizer CNN 118 may be trained to predict parameters of a model for this filter (instead of directly predicting the coefficients of the filter, for example) in some implementations.

The model may be a generalization of the Difference-of-Gaussians, and/or may be a linear combination of several two-dimensional (2D) Gaussians filters. Each of the Gaussian filters may have a different fixed standard deviation. The normalizer CNN 118 may be trained to predict the weights of this linear combination in accordance with Equation (7).

$$I^{ALCN} = \left( \sum_{i=1}^{N} f_i(I) \cdot G_{\sigma_i^{ALCN}} \right) * I \quad (7)$$

In Equation (7), I is the input image (e.g., window), N is the number of 2D Gaussian filters, $G_{\sigma_i^{ALCN}}$ is a Gaussian filter, $\{\sigma_i^{ALCN}\}_i$ are the fixed standard deviations, and $f_i(I)$ is the i-th weight predicted by the normalizer CNN 118. $I^{ALCN}$ may denote the illumination normalized image window, where ALCN denotes adaptive local contrast normalization. It should be noted that the input image window I may or may not include the target object (e.g., object of interest). In some configurations of the systems and methods disclosed herein, Equation (2) may be extended to use more Gaussian 2D kernels. One benefit to this approach is that there may be a fixed Gaussian 2D kernel where only the coefficients $k_i$ are learned for each window (e.g., patch). In some configurations, different normalizations may be applied to two or more windows of an image.

In experimental evaluation, only two Gaussian filters were used initially, to compare with DoG. It was observed that the adaptation of the normalizer to the input image may be a significant factor for its performance. 10 different 2D Gaussian filters $G_{\sigma_i^{ALCN}}$ with standard deviation $\sigma_i^{ALCN} = i*0.5$ were also experimentally evaluated. FIGS. 7-15 illustrate some evaluation results.

The processor 112 may optionally include and/or implement a second CNN (e.g., a detector CNN 120). In some cases and/or configurations, for instance, one or more images obtained by the image obtainer 114 may include one or more objects for object detection. The processor 112 may utilize the detector CNN 120 to detect one or more objects in some configurations. The electronic device 102 (e.g., processor 112, detector CNN 120, and/or another element) may detect the location(s) of one or more objects in the image. For example, the detector CNN 120 may indicate one or more windows of the image that may include one or more target objects.

In some configurations, the processor 112 may (for each window in a set of windows, for example) analyze one or more normalized windows with a second CNN (e.g., the detector CNN 120) for scoring the normalized window(s). For example, windows that include the target object may be scored higher than other windows. The processor 112 may detect the target object in one or more normalized windows with the largest score(s). For example, the processor 112 may label one or more windows including the target object(s). The processor 112 may indicate the detected object(s). For example, the processor 112 may present a marker (e.g., box, icon, text, etc.) associated with the detected object on the display 124. Additionally or alternatively, the processor 112 may provide and/or send an indicator of the location of a detected object in an image.

It may be beneficial to utilize the detector CNN 120 to detect one or more objects. For example, a detector CNN 120 may be utilized because deep architectures may perform well for object detection. Additionally or alternatively, utilizing a detector CNN 120 may enable joint training of the normalizer CNN 118 and the detector CNN 120. In contrast with some other approaches to object category recognition, some configurations of the detector CNN 120 may utilize a relatively small network, with only a few layers. In some configurations, a relatively small network with only a few layers may perform well. The detector CNN 120 may predict the likelihood of the presence of the target object(s) in an image window that is normalized based on the normalizer CNN 118 and the normalization model. In some configurations, the normalizer CNN 118 and/or the detector CNN 120 may be applied to one or more (e.g., all) of the windows of an image in a sliding-window fashion.

The processor 112 may include and/or implement a CNN trainer 128. The CNN trainer 128 may train one or more CNNs (e.g., the normalizer CNN 118 and/or the detector CNN 120). For example, the image obtainer 114 may obtain a set of images, where a subset of the images includes a target object. The set of images may be provided to the CNN trainer 128.

The CNN trainer 128 may train the normalizer CNN 118 for predicting parameters of an illumination normalization model based on the set of images. Additionally or alternatively, the CNN trainer 128 may train the detector CNN 120 for detecting the target object based on the set of images and the illumination normalization model. In some configurations, the normalizer CNN 118 and the detector CNN 120 may be trained jointly. Training the normalizer CNN 118 and the detector CNN 120 may be based on minimizing a joint loss function. In some configurations, the CNN trainer may train another detector CNN 120 for a different target object based on the illumination normalization model.

Joint training may be performed and/or utilized in some configurations as follows. It should be noted that training (e.g., joint training) may be performed by the electronic device 102 or by another device. To improve (e.g., optimize) the parameters of the normalizer CNN 118, for example, the normalizer CNN 118 may be jointly trained with a CNN for performing the object detection itself (e.g., the detector CNN 120). This may be accomplished in accordance with Equation (8) (by minimizing the loss function, for example).

$$(\hat{\Theta}, \hat{\Phi}) = \underset{\Theta, \Phi}{\operatorname{argmin}} \sum_i l\left(g^{(\Theta)}\left(\left[\sum_{i=1}^{N} f_i^{(\Phi)}(I_i) \cdot G_{\sigma_i^{ALCN}}\right] * I_i\right); y_i\right) \quad (8)$$

In Equation (8), $\Theta$ and $\Phi$ are the parameters of the detector CNN (g) and the normalizer CNN (f), respectively. In Equation (8), the $\{(I_i, y_i)\}_i$ are annotated training image windows and $l(I,y)$ is a loss function. A negative log-likelihood may be utilized for the loss function, for example. In some configurations, such an optimization problem may be solved with a software library. For example, a normalizer CNN 118 may be trained together with a detector CNN 120 using training images. Accordingly, the normalizer CNN 118 may predict parameters (e.g., best retina parameters) with respect to each given image, in order to improve the performance of the detector CNN 120. At run-time, the normalizer CNN 118 may be run first on the input image and then the detector CNN 120 may be provided the normalized input image.

In some configurations, the normalizer CNN 118 may be capable of generalization to different target objects. For example, the normalizer CNN 118 may generalize to other objects in the following approach. The normalizer CNN 118 may be trained jointly with a detector CNN 120 first to recognize one or more objects from a set of objects (in a dataset, for example). The normalizer CNN 118 parameters may then be frozen and a new detector CNN 120 may be trained to detect novel objects in images pre-processed by the fixed normalizer CNN 118. This approach may result in a very small loss of performance compared to joint training and/or may result in saving training time as training the detector CNN 120 only may be faster than training (e.g., re-training) both the normalizer CNN 118 and the detector CNN 120.

The processor 112 may optionally include and/or implement a normalization manager 130. The normalization manager 130 may perform one or more operations. In some configurations, the normalization manager 130 may normalize one or more entire images. For example, the normalization manager 130 may share predicted weights for each window to normalize an entire image. Additionally or alternatively, the normalization manager 130 may normalize one or more color images. Normalizing one or more entire images and/or one or more color images may enable one or more types of processing (e.g., computer vision applications). For example, the electronic device 102 may perform object tracking, image modification (e.g., object removal, object cloning, etc.), object recognition, object detection, autofocus, automatic zoom, autonomous driving, assisted driving, navigation, etc., based on the normalized image(s). For instance, the electronic device 102 may detect an object in an image, track an object in a series of images (e.g., video), modify an image, recognize one or more objects in an image, automatically focus one or more optical systems (e.g., lenses), automatically zoom in on a detected object, drive autonomously (e.g., read signs, detect pedestrians, detect obstacles for avoidance, detect other vehicles, control a drive train, control braking, steering, etc.), assist a driver (e.g., apply emergency braking, perform an emergency maneuver, alert a driver of a sign, alert a driver of an obstacle, etc.), perform navigation (e.g., plan a path for a robot or drone, assemble an object, disassemble an object, etc.), etc., based on one or more normalized images and/or normalized image windows.

The normalization manager 130 may operate in conjunction with one or more of the image obtainer 114, the window determiner 116, the normalizer CNN 118, the detector CNN 120, and/or the CNN trainer 128 (and/or one or more corresponding functions). For example, the normalizer CNN 118 may be trained jointly with the detector CNN 120 to normalize a grayscale image window. The normalization manager 130 may extend the grayscale image window normalization to color image normalization in some configurations.

For example, training images of the target object under different lighting conditions may be obtained (e.g., collected), with a 2D bounding box centered on the object. The images may be real images or synthetic images as described above. ALCN may be a generalization of Difference-of-Gaussians, which may be a linear combination of several 2D Gaussians filters, where each of the filters may have a different fixed standard deviation. The normalizer CNN 118 may be trained to predict the weights of this linear combination. For example, training may be carried out as described above in connection with Equation (7).

The normalizer CNN 118 and the detector CNN 120 may be jointly trained (e.g., trained together) using the training images. Accordingly, the normalizer CNN 118 may predict weights (e.g., the best weights) with respect to each given image window to improve the performance of the detector CNN 120. In some configurations, the normalizer CNN 118 and the detector CNN 120 may be trained once (for a first object, for example). Then, the detector CNN 120 may be retrained (for a second object, for example) while the normalizer CNN 118 parameter(s) are held constant.

Accordingly, the retraining of the detector CNN 120 may be a "joint" training in that the retraining depends on the normalizer CNN 118. It should be noted that although this retraining may be a "joint" training, the normalizer CNN 118 may not be retrained in some cases. In some approaches, both the normalizer CNN 118 and the detector CNN 120 may both be trained for one or more trainings (where the normalizer CNN 118 parameter(s) are not held constant, for example).

The normalization manager 130 may normalize an entire image. For example, at run-time, image window normalization may be utilized to normalize the whole image. For example, the normalization manager 130 may determine (e.g., compute) an entire normalized image based on a predicted weight matrix. In some approaches, this may be accomplished by extending Equation (7) as illustrated in Equation (9).

$$I^{ALCN} = \sum_{i=1}^{N} G_{\sigma_i^{ALCN}} * (F(I) \circ I) \quad (9)$$

In Equation (9), $F_k(I)$ is a predicted weight matrix with the same dimensions as the input image I (e.g., an entire image) for the k-th 2D Gaussian filter and $\circ$ is the Hadamard product. The weight matrix of the k-th 2D Gaussian filter may be determined (e.g., assembled, computed, etc.) in accordance with Equation (10) in some configurations.

$$[F_k(I)]_{ij} = f_k(I_{ij}) \quad (10)$$

In Equation (10), is an entry in the i-th row and j-th column of the matrix, $I_{ij}$ is the image window centered at (i, j) in the image I, and $f_k(\bullet)$ is the k-th weight predicted by the normalizer CNN 118 for the given image window.

In some configurations, the normalization manager 130 may transform (e.g., linearly transform) the intensity values to a range (e.g., a range (0, 255), which is a valid range for grayscale images). Transforming the intensity values to a range may enable the normalized image to be used for some computer vision applications. In some configurations, transforming the intensity values to a range may be accomplished in accordance with Equation (11).

$$I'^{ALCN} = \left\lceil (I^{ALCN} - A) \frac{255}{(B-A)} \right\rceil \quad (11)$$

In Equation (11), $\lceil \bullet \rceil$ returns a nearest integer value and A and B are the smallest and largest possible intensity values predicted by ALCN, respectively. These values may be achieved by normalizing a large number (e.g., a very large number) of random images using ALCN, and getting the smallest and largest intensity values.

In some configurations, the normalization manager 130 may normalize a color image. For example, the normalization manager 130 may transform an input color image into a color space. The normalization manager 130 may then normalize the lightness of the image as described above. For instance, the normalization manager 130 may normalize the entire image (according to Equations (9)-(10), for example). The normalization manager 130 may also transform (e.g., linearly transform) the intensity values. This may be accomplished in accordance with Equation (11), for example.

In some configurations, the normalization manager 130 may normalize a color image as follows. To normalize a color image $\mathbb{I}$, the normalization manager 130 may transform the input color image to produce a lightness (e.g., a lightness channel in the CIE Lab color space). Then, the normalization manager 130 may normalize the lightness of the image (I) as described above. For example, the normalization manager 130 may transform the lightness as described in connection with normalizing an entire image (e.g., Equations (9)-(10)). The normalization manager 130 may transform (e.g., linearly transform) the normalized image to a range (in accordance with Equation (11), for example). The normalization manager 130 may retransform the image in the RGB space without changing the color channel (e.g., ab channel, $\mathbb{I}_{ab}$, etc.). Retransforming the image may be accomplished in accordance with Equation (12), for example.

$$\mathbb{I}^{ALCN} = [\mathbb{I'}_L^{ALCN}; \mathbb{I}_{ab}] \quad (12)$$

It should be noted that one or more of the operations described herein may be performed for one or more images. For example, the processor 112 may perform one or more of the operations described herein on multiple images.

It should be noted that one or more of the elements or components of the electronic device 102 may be combined and/or divided. For example, the image obtainer 114, the window determiner 116, the normalizer CNN 118, the detector CNN 120, the CNN trainer 128, and/or the normalization manager 130 may be combined. Additionally or alternatively, one or more of the image obtainer 114, the window determiner 116, the normalizer CNN 118, the detector CNN 120, the CNN trainer 128, and/or the normalization manager 130 may be divided into elements or components that perform one or more subsets of the operations thereof.

Figure 2:
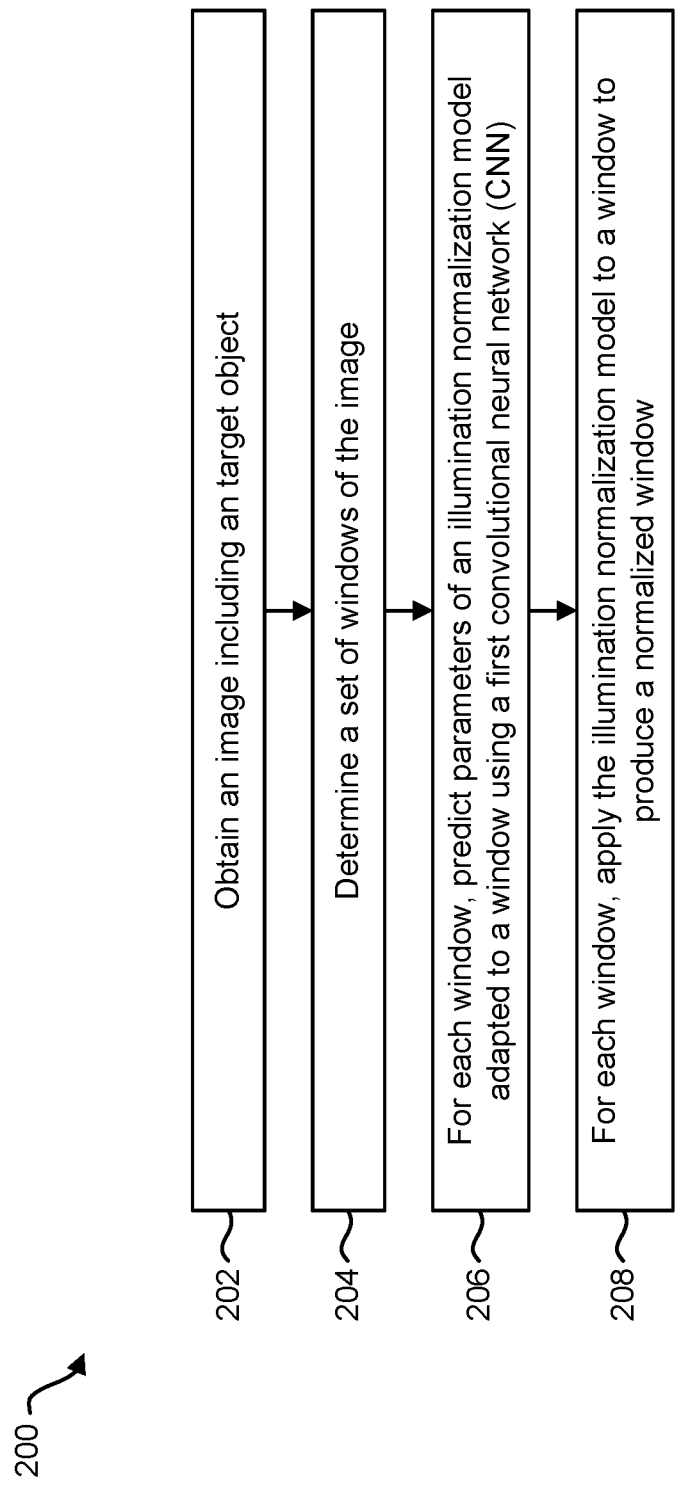
FIG. 2 is a flow diagram illustrating one configuration of a method for normalizing an image.

FIG. 2 is a flow diagram illustrating one configuration of a method 200 for normalizing an image. The method 200 may be performed by an electronic device (e.g., the electronic device 102 described in connection with FIG. 1).

The electronic device 102 may obtain 202 an image including a target object. This may be accomplished as described in connection with FIG. 1. For example, the electronic device 102 may capture one or more images with one or more image sensors 104 and/or may receive one or more images from one or more remote devices.

The electronic device 102 may determine 204 a set of windows of the image. This may be accomplished as described in connection with FIG. 1. For example, the electronic device 102 may utilize a sliding window approach to determine 204 the set of windows. For instance, each window may be a subset of the image. The windows may or may not overlap. The windows may be of uniform size or varying size.

The electronic device 102 may (for each window of the set of windows) predict 206 parameters of an illumination normalization model adapted to a window using a first CNN (e.g., normalizer CNN). This may be accomplished as described in connection with FIG. 1. It should be noted that the parameters may be different for two or more of the windows. In some configurations, the parameters may be weights for filters (e.g., Gaussian filters).

The electronic device 102 may (for each window of the set of windows) apply 208 the illumination normalization model to a window to produce a normalized window. This may be accomplished as described in connection with FIG. 1. One or more of the normalized windows may be utilized. For example, one or more normalized windows may be presented on a display. Additionally or alternatively, one or more normalized windows may be provided to a computer vision application (for detecting an object, autofocus, auto-zoom, object tracking, object identification, object recognition, etc.).

Figure 3:
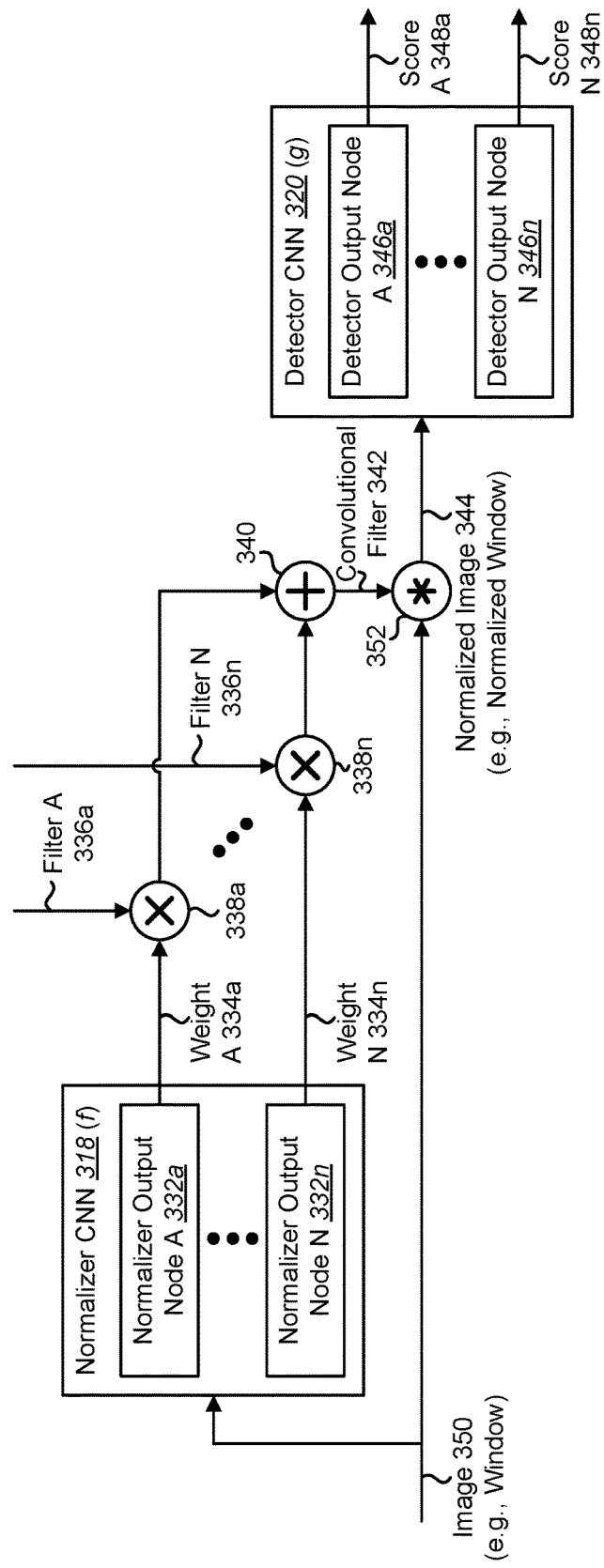
FIG. 3 is a block diagram illustrating an example of a normalizer convolutional neural network (CNN) and/or a detector CNN.

FIG. 3 is a block diagram illustrating an example of a normalizer convolutional neural network (CNN) 318 and/or a detector CNN 320. FIG. 3 illustrates an overview of some configurations of the systems and methods disclosed herein. Specifically, FIG. 3 illustrates an example of a normalizer CNN 318 (e.g., f) and a detector CNN 320 (e.g., g). The normalizer CNN 318 may be one example of the normalizer CNN 118 described in connection with FIG. 1. Additionally or alternatively, the detector CNN 320 may be one example of the detector CNN 120 described in connection with FIG. 1. The detector CNN 320 may be optional and/or may not be implemented in some configurations.

One or more of the structures described in connection with FIG. 3 may be implemented in the electronic device 102 described in connection with FIG. 1 in some configurations. Additionally or alternatively, one or more of the functions and/or procedures described in connection with FIG. 3 may be performed by the electronic device 102 described in connection with FIG. 1 in some configurations. The structure illustrated in FIG. 3 may be utilized for CNN training (e.g., joint training) and/or may be utilized at run-time for normalizing one or more images and/or for detecting one or more objects.

The normalizer CNN 318 may receive an image 350 (e.g., an image window). The normalizer CNN 318 may include one or more output nodes A-N 332a-n (e.g., neurons). The normalizer CNN 318 may be utilized to predict weights A-N 334a-n (of the ALCN, for example) depending on the image 350 (e.g., window). The predicted weights A-N 334n may be respectively multiplied 338a-n with filters A-N 336a-n (e.g., Gaussian filters). Each of the resulting products may be summed 340 to create a convolutional filter 342. The convolutional filter 342 may be convolved 352 with the image 350 (e.g., image window) to produce a normalized image 344 (e.g., normalized window). As illustrated in FIG. 3, an electronic device 102 may normalize an image (e.g., window) by applying a normalizer CNN 318, by multiplying 338a-n predicted weights 334a-n with filters 336a-n, by summing 340 the weighted filters, and/or by convolving 352 the convolutional filter 342 with the image 350 (e.g., window). One or more of these operations may be performed in accordance with Equation (7) and/or Equation (8). The normalizer CNN 318 may operate based on a parameter (e.g., Φ).

The detector CNN 320 (e.g., g) may receive the normalized image 344 (e.g., normalized window). The detector CNN 320 may include one or more detector output nodes 346a-n (e.g., neurons). The detector CNN 320 (e.g., the detector output nodes A-N 346a-n) may produce respective scores A-N 348a-n. One or more of the scores A-N 348a-n may indicate a likelihood that an object is in the image (e.g., window). For example, different scores 348 may represent likelihoods that different objects are in the image (e.g., window). In some configurations, a score 348 may indicate a likelihood that the image (e.g., window) is background (e.g., does not include a target object). The detector CNN 320 may operate based on a parameter (e.g., Θ). In some configurations, the normalizer CNN 318 and the detector CNN 320 may be jointly trained (e.g., parameters Θ and Φ may be determined jointly).

Figure 4:
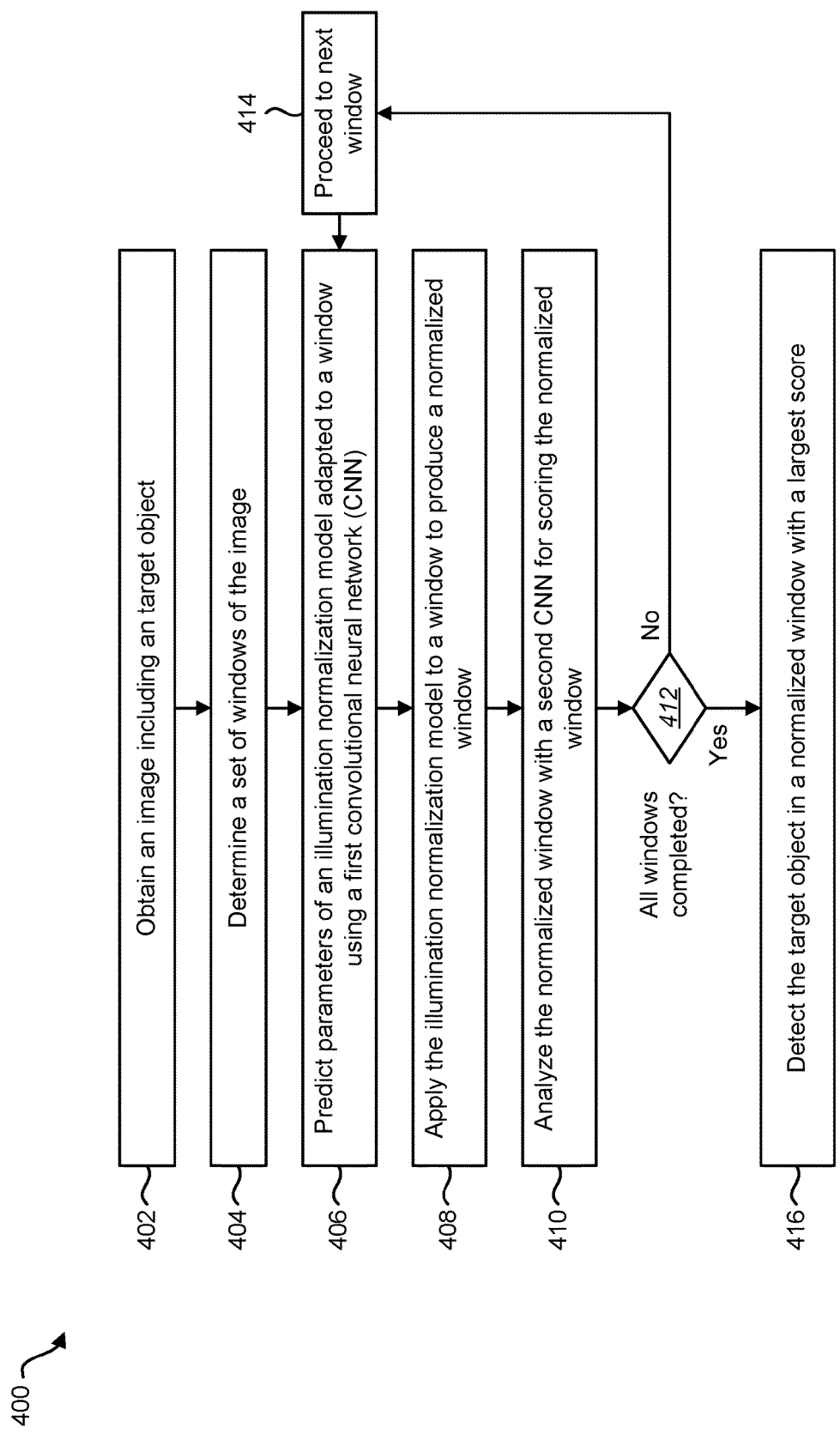
FIG. 4 is a flow diagram illustrating one configuration of a method for detecting an object.

FIG. 4 is a flow diagram illustrating one configuration of a method 400 for detecting an object. The method 400 may be performed by an electronic device (e.g., the electronic device 102 described in connection with FIG. 1) and/or by one or more of the components described in connection with FIG. 3.

The electronic device 102 may obtain 402 an image including a target object. This may be accomplished as described in connection with one or more of FIGS. 1-2. For example, the electronic device 102 may capture one or more images with one or more image sensors 104 and/or may receive one or more images from one or more remote devices.

The electronic device 102 may determine 404 a set of windows of the image. This may be accomplished as described in connection with one or more of FIGS. 1-2. For example, the electronic device 102 may utilize a sliding window approach to determine 404 the set of windows.

The electronic device 102 may predict 406 parameters of an illumination normalization model adapted to a window using a first CNN (e.g., normalizer CNN). This may be accomplished as described in connection with one or more of FIGS. 1-3. For example, the electronic device 102 may predict 406 weights based on a pre-trained parameter (e.g., Φ).

The electronic device 102 may apply 408 the illumination normalization model to a window to produce a normalized window. This may be accomplished as described in connection with one or more of FIGS. 1-3.

The electronic device 102 may analyze 410 the normalized window with a second CNN (e.g., detector CNN) for scoring the normalized window. This may be accomplished as described in connection with one or more of FIGS. 1 and 3. For example, a detector CNN may receive a normalized window. The detector CNN may determine one or more scores. For example, the detector CNN may produce one or more scores based on a trained parameter (e.g., Θ).

The electronic device 102 may determine 412 whether all windows have been completed. For example, the electronic device 102 may determine whether all of the windows of a set of windows (e.g., of an image) have been iterated through (e.g., whether steps 406, 408, and/or 410 have been performed for all of the set of windows).

If not all windows have been completed, the electronic device 102 may proceed 414 to the next window. For example, the electronic device 102 may perform steps 406, 408, and/or 410 for a next window in the set of windows.

If all windows have been completed, the electronic device 102 may detect 416 the target object in a normalized window with a largest score. This may be accomplished as described in connection with one or more of FIGS. 1 and 3. For example, the electronic device 102 (e.g., processor 112, normalization manager 130, etc.) may determine a maximum score in the set of scores. In some configurations, the normalized window with the largest score (above a threshold, for example) may be detected as including the target object.

Figure 5:
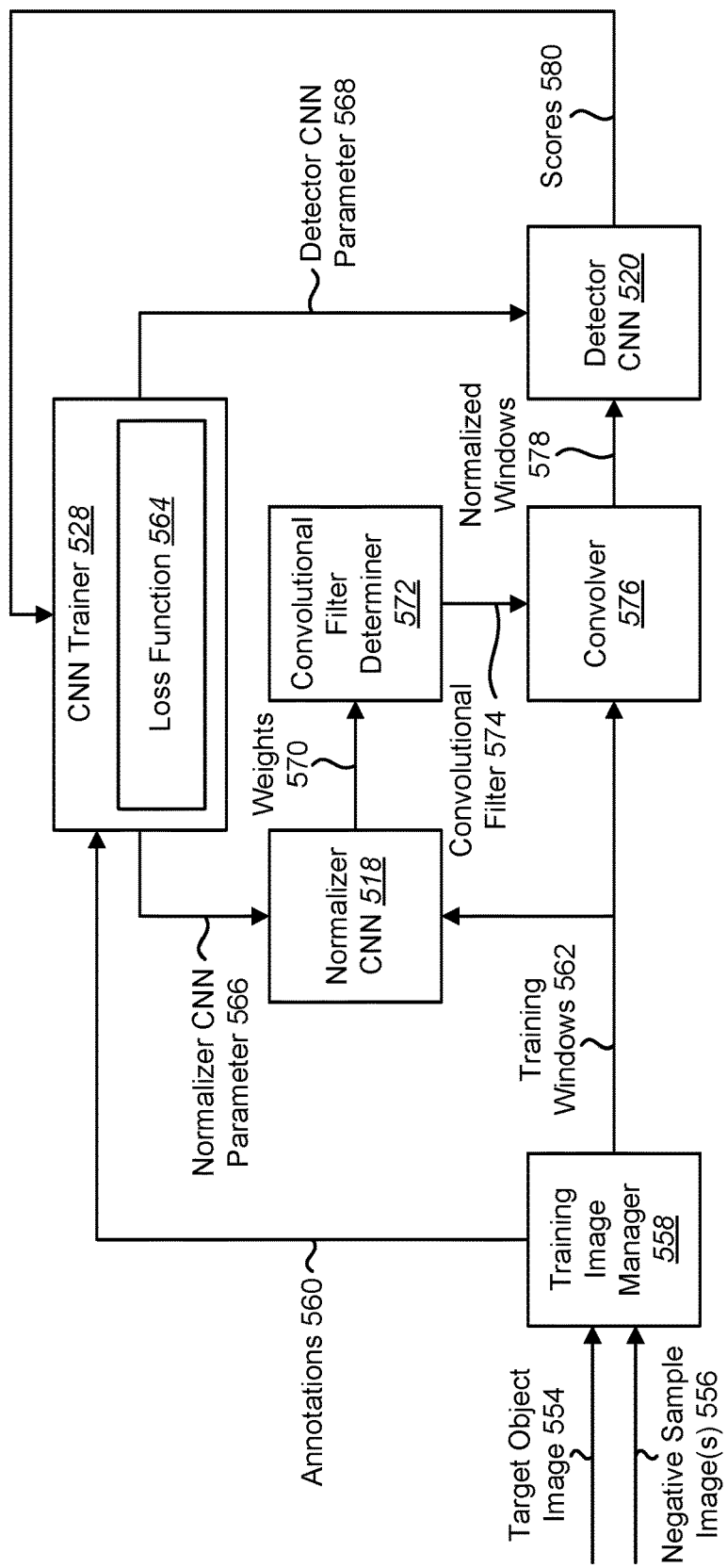
FIG. 5 is a block diagram illustrating an example of CNN training in accordance with some configurations of the systems and methods disclosed herein.

FIG. 5 is a block diagram illustrating an example of CNN training in accordance with some configurations of the systems and methods disclosed herein. Specifically, FIG. 5 illustrates an example of a normalizer CNN 518 (e.g., f), a detector CNN 520 (e.g., g), and a CNN trainer 528. The normalizer CNN 518 may be one example of the normalizer CNN 118, 318 described in connection with one or more of FIGS. 1 and 3. Additionally or alternatively, the detector CNN 520 may be one example of the detector CNN 120, 320 described in connection with one or more of FIGS. 1 and 3. In some configurations, training may be accomplished in accordance with Equation (8).

One or more of the structures described in connection with FIG. 5 may be implemented in the electronic device 102 described in connection with FIG. 1 in some configurations. Additionally or alternatively, one or more of the functions and/or procedures described in connection with FIG. 5 may be performed by the electronic device 102 described in connection with FIG. 1 in some configurations. The structure illustrated in FIG. 5 may be utilized for CNN training (e.g., joint training).

A training image manager 558 may be optionally implemented and/or utilized in some configurations. For example, the training image manager 558 may be included in and/or implemented by the processor 112. The training image manager 558 may obtain and/or provide one or more training windows 562 and/or one or more corresponding annotations 560. An annotation 560 may indicate whether a target object is included in a corresponding training window 562.

In some configurations, the training image manager 558 may receive a target object image 554 and/or one or more negative sample images 556. The target object image 554 may include a target object. The target object image 554 may include only a target object (e.g., may be an image of only a target object) in some approaches. In some approaches, the target object image 554 may include more than the target object. The target object image 554 may indicate a segmentation of the target object from the whole image in some approaches. The negative sample image(s) 556 may be images that do not include the target object.

In some configurations, the training image manager 558 may obtain and/or provide one or more datasets and/or one or more images based on one or more datasets. For example, there may be no standard dataset for benchmarking 2D object detectors in presence of drastic light conditions and complex backgrounds. Some datasets have instances captured under different illuminations, such as the NORB dataset, the ALOI dataset, or the CMU Multi-PIE dataset. However, they may not suitable for some scenarios. For example, the NORB dataset has only 6 different lighting directions, the images of the ALOI dataset contain a single object only and over a black background, and the CMU Multi-PIE dataset was developed for face recognition and the image is always centered on the face.

A dataset may be created and/or utilized for benchmarking of object detection under challenging light conditions, with distractor objects and cluttered backgrounds. An example dataset may include three parts. Each part may include a reference image of a target object and test images under different illuminations, under different lighting colors, with various backgrounds, and/or with cluttering objects. Some examples of target objects may have various material properties (e.g., matte and/or shiny materials) and/or may have complex three-dimensional (3D) shapes (e.g., a plastic toy, a small puppet made of velvet, a metallic key, etc.). For each object, for example, the dataset may include 10 grayscale 32×32 real training images and 1200 1280×800 grayscale test images. About 25% of the test images (e.g., negative sample images 556) may not include the target object. Ground truth bounding boxes in the test images in which the target object is present may be manually and/or automatically annotated. For example, the training image manager 558 may automatically annotate images that are synthesized to include the target object. The objects may be moved on a planar surface, in order to limit the perspective appearance changes and focus on the illumination variations. The objects may have complex shapes and different materials, and may exhibit complex illumination variations.

In some configurations, the training image manager 558 may generate (e.g., synthesize) one or more synthetic images (e.g., training windows 562 with corresponding annotations 560). For example, the training image manager 558 may obtain (e.g., request and/or receive) a target object image 554 (e.g., $I_{ref}$ of the target object). Given the target object image 554, the training image manager 558 may generate synthetic images for use in training. As described above, the target object may be segmented based on a received input (e.g., manually so the background may be easily changed) or automatically.

In some configurations, training images (e.g., training windows) may be generated in accordance with the formula $I_{new}=\text{clip}(I_{interm}+U_c)$, where $U_c$ is made of noise sampled from a uniform distribution between −c and +c, and clip(I) is a function that clips intensity values to an interval (e.g., the [0; 255] interval) to mimic saturation effects. $I_{interm}$ may be an intermediate image that can influence the amount of noise c in accordance with Equation (13).

$$I_{interm}=a(bg(\text{scale}_s(I_{ref}))+b \qquad (13)$$

In Equation (13), a, b, and s may be values randomly sampled from the ranges [1−A; 1+A], [−B; +B], and [1−S; 1+S], respectively. bg(I) is a function that replaces the background of I by a random background, which may be uniform or cropped from an image from a dataset. $\text{scale}_s(I)$ is a function that upscales or downscales I by a factor s, which may be useful to detect the target object under (slightly) different scales. It may be beneficial to make the amount of noise dependent on the brightness of the image. Because of camera enhancement functions, for example, dark images are often noisier than bright images. In some configurations, a simple heuristics may therefore be used to vary the amount of noise. In some approaches, $c=\max(10, C-\overline{I_{interm}})$, where $\overline{I_{interm}}$ is an average intensity of the intermediate image $I_{interm}$. In some examples, A=0.5, B=0.4, S=0.1, and C=45. These values may provide reasonably good results. Images from various datasets may be utilized as negative sample images 556.

The CNN trainer 528 may receive annotations 560 and the normalizer CNN 518 may receive corresponding training windows 562. The CNN trainer 528 may provide a normalizer CNN parameter 566 (e.g., Φ) to the normalizer CNN 518 and may provide a detector CNN parameter 568 (e.g., Θ) to the detector CNN 520. The normalizer CNN 518 may generate weights 570 depending on the training window 562. The weights 570 may be provided to a convolutional filter determiner 572. The convolutional filter determiner 572 may respectively multiply the weights 570 with filters (e.g., Gaussian filters). The convolutional filter determiner 572 may sum the resulting products to create a convolutional filter 574. The convolutional filter 574 may be provided to a convolver 576.

The convolver 576 may convolve the convolutional filter 574 with one or more training windows 562 to produce one or more normalized windows 578. The normalized window 578 may be provided to the detector CNN 520.

The detector CNN 520 (e.g., g) may receive the normalized window 578. The detector CNN 520 may produce one or more scores 580 based on the detector parameter (e.g., Θ). The score(s) 580 may indicate a likelihood that an object is in the normalized window and/or a likelihood that the normalized window 578 is background (e.g., does not include a target object). The score(s) 580 may be provided to the CNN trainer 528.

The CNN trainer 528 may include a loss function 564. The CNN trainer 528 may evaluate the loss function based on the annotation(s) 560, the score(s) 580, the normalizer CNN parameter 566, and/or the detector CNN parameter 568. For example, the CNN trainer 528 may determine a normalizer CNN parameter 566 and/or a detector CNN parameter 568 that minimizes the loss function 564. One example of the loss function 564 is a negative log-likelihood. In some configurations, the CNN trainer 528 may perform training (e.g., joint CNN training) in accordance with Equation (8).

Some configurations of the systems and methods disclosed herein may operate in accordance with the following examples. In some examples, the same architecture may be implemented for the normalizer CNN 518 and the detector CNN 520. For instance, the first layer may perform 20 convolutions with 5×5 filters on a 32×32 input patch with 2×2 max-pooling, computing 20 feature maps of size 14×14. The second layer may produce 50 high-level features by performing 5×5 convolutions followed by 2×2 max-pooling on the output of first layer. The third layer may be a fully connected layer of 1024 hidden units. The last layer of the detector CNN 520 may output the likelihoods of the window (e.g., patch) to correspond to the target object(s) or to the background, while the normalizer CNN 518 returns the predicted weights. For the activation function, the tan h function may be utilized. For example, tan h may perform better for some problems than a rectified linear unit (ReLU).

The parameters for the normalizer CNN 518 and the detector CNN 520 may be optimized by minimizing the negative log-likelihood on the training set. For example, an rmsprop algorithm and/or Dropout may be utilized in the optimization in some configurations. In some approaches, mini-batches of 128 training samples may be utilized. 500,000 synthetic images may be generated, with the same number of false and negative images.

At test time, detection may be performed on some or all windows (e.g., 32×32 image windows) extracted from a test image. If the estimated likelihood is higher than a threshold for one window, the electronic device (e.g., object detector) may determine that this window contains the object. Precision-recall curves may be obtained by varying this threshold. In order to assess the effects of different normalization techniques on the detection performances, the same detector may be employed for all the normalization techniques compared in connection with FIGS. 7-9, re-training the detector for every normalization technique.

Figure 6:
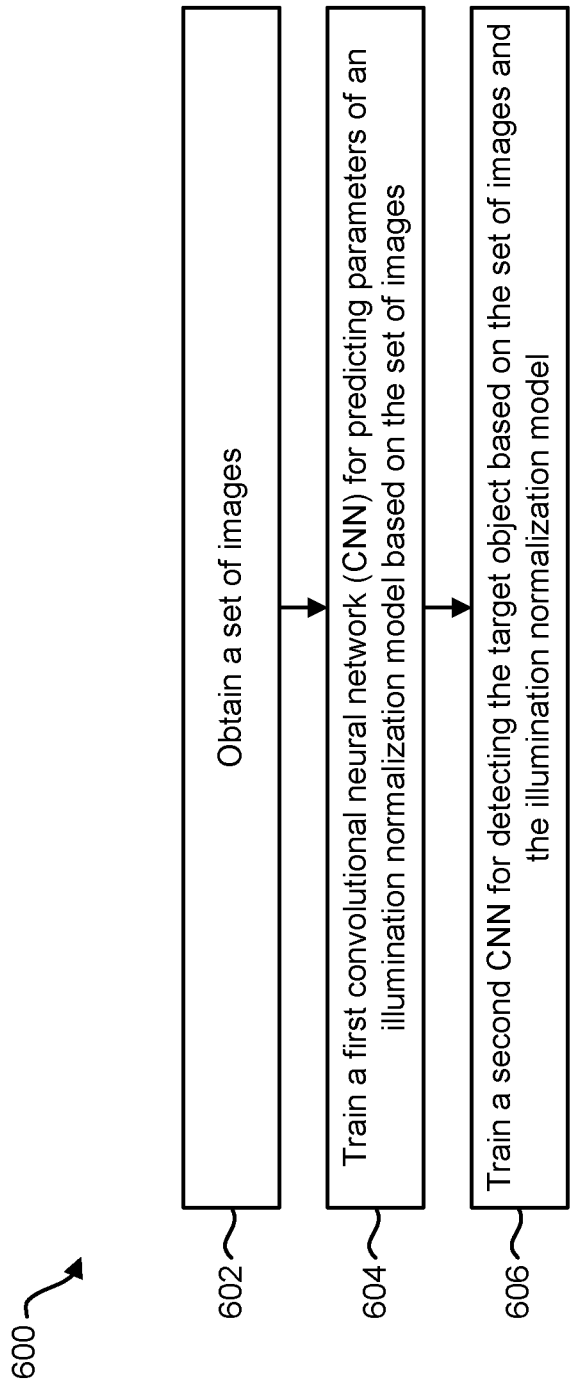
FIG. 6 is a flow diagram illustrating one configuration of a method for training one or more convolutional neural networks.

FIG. 6 is a flow diagram illustrating one configuration of a method 600 for training one or more convolutional neural networks (CNNs). The method 600 may be performed by an electronic device (e.g., the electronic device 102 described in connection with FIG. 1) and/or one or more of the components described in connection with one or more of FIGS. 3 and 5.

The electronic device 102 may obtain 602 a set of images (e.g., training images). A subset of the images may include a target object. This may be accomplished as described in connection with FIG. 1. For example, the electronic device 102 may capture one or more images with one or more image sensors 104 and/or may receive one or more images from one or more remote devices. Additionally or alternatively, the electronic device 102 generate (e.g., synthesize) one or more images (e.g., training images) as described in connection with FIG. 5.

The electronic device 102 may train 604 a first CNN (e.g., normalizer CNN) for predicting parameters of an illumination normalization model based on the set of images. This may be accomplished as described in connection with one or more of FIGS. 1, 3, and 5.

The electronic device 102 may train 606 a second CNN (e.g., detector CNN) for detecting the target object based on the set of images and the illumination normalization model. This may be accomplished as described in connection with one or more of FIGS. 1, 3, and 5. It should be noted that training 604 the first CNN and training 606 the second CNN may be performed jointly in some configurations.

Figure 7:
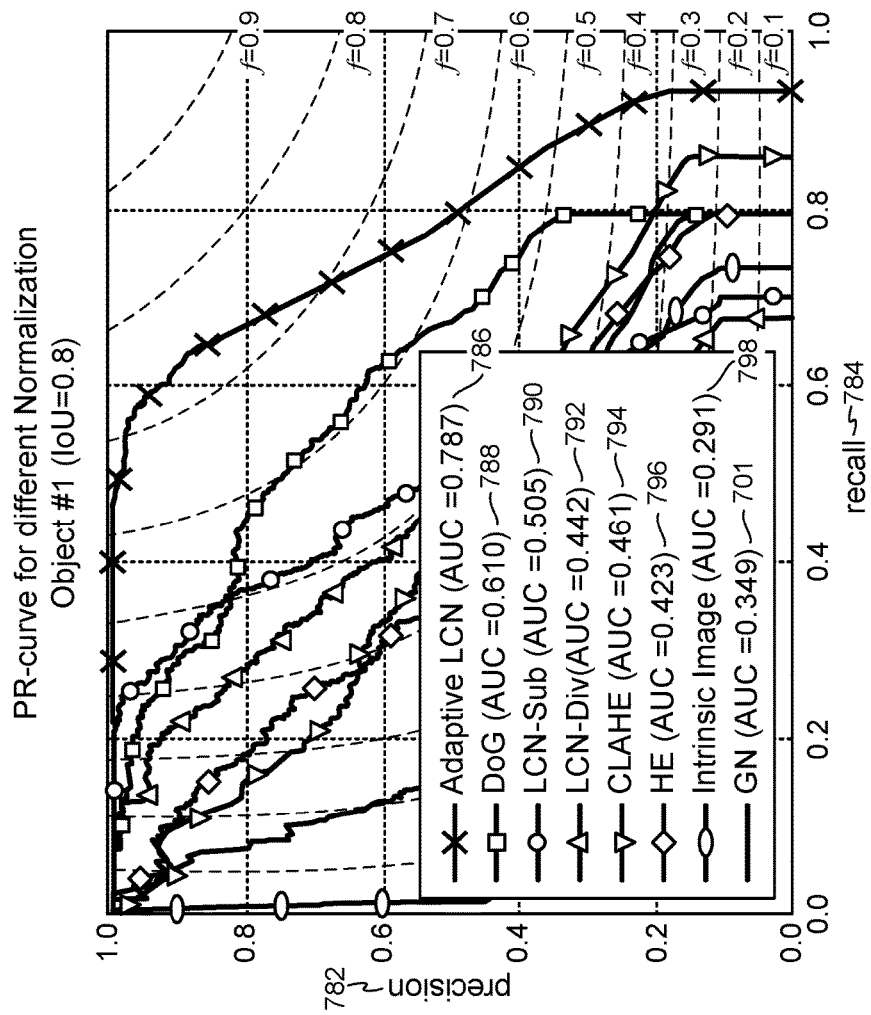
FIG. 7 is a graph illustrating precision and recall for several object detection techniques for a target object.
Figure 8:
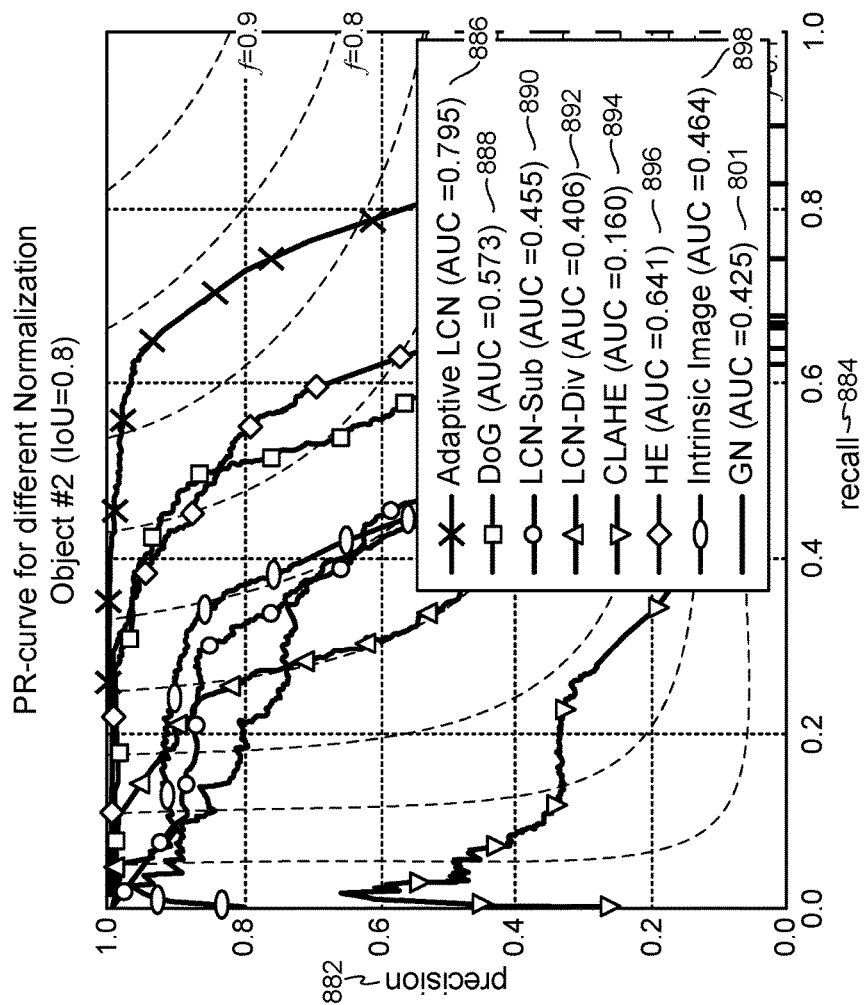
FIG. 8 is a graph illustrating precision and recall for several object detection techniques for another target object.
Figure 9:
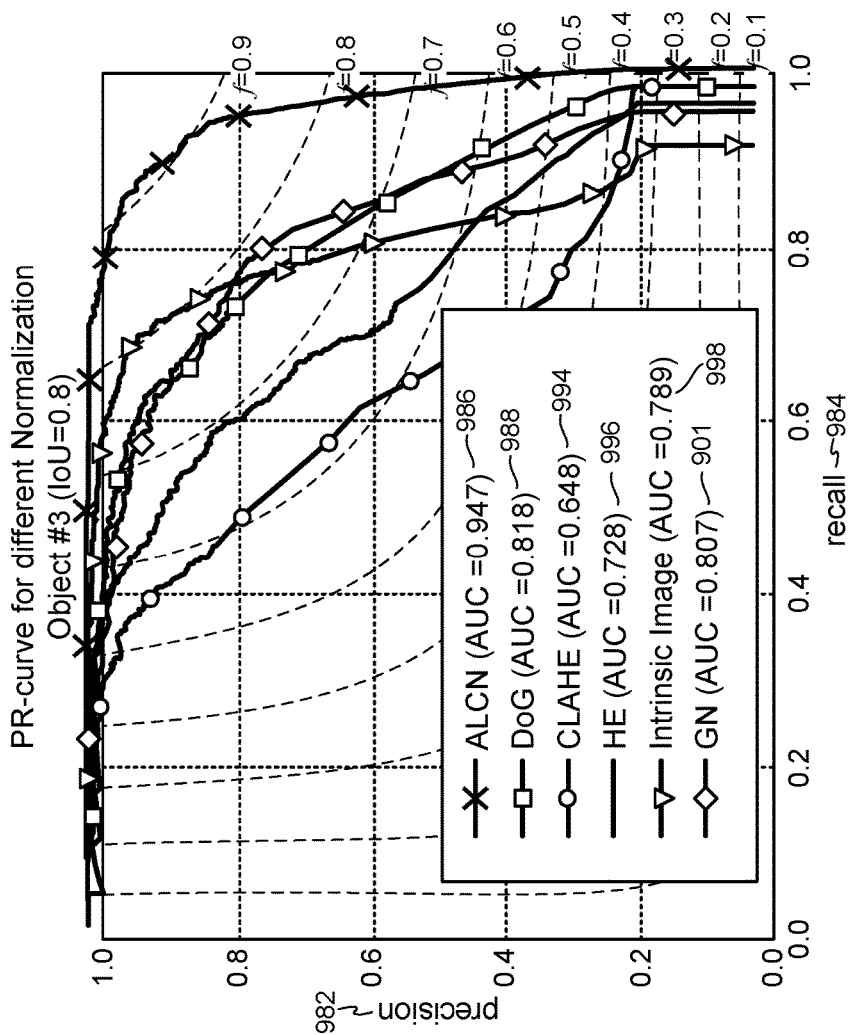
FIG. 9 is a graph illustrating precision and recall for several object detection techniques for yet another target object.

FIG. 7 is a graph illustrating precision and recall for several object detection techniques for a target object. For evaluation, the PASCAL criterion may be utilized to decide if a detection is correct with an Intersection over Union (IoU) of 0.8. FIGS. 7-9 illustrate Precision-Recall (PR) curves and Areas Under Curve (AUC) to compare the performances of different techniques. The size of the image windows is fixed to 32×32 pixels in the evaluation. It should be noted that other image window sizes may be utilized.

For example, DoG and LCN Precision-Recall curves were compared for the DoG, subtractive LCN, and divisive LCN normalization methods, when varying the parameters given in Equations (2), (3) and (4) respectively. DoG tends to perform better than Subtractive LCN, which performs better than divisive LCN, probably because divisive LCN can become unstable on uniform regions. It should be noted that small variations of these values may have a large impact of the final performance, which means that these values should be carefully tuned in practice.

The performance of DoG normalization appears to be very sensitive to its parameters. Therefore, four DoG parameters were experimentally jointly optimized at the same time as a detector CNN. This was accomplished in accordance with Equation (14).

$$(\hat{\Theta}, \hat{\Phi}) = \underset{\Theta, \Phi}{\mathrm{argmin}} \sum_i \ell(g^{(\Theta)}(DoG^{(\Phi)} * I_i); y_i) \quad (14)$$

In Equation (14), $\Theta$ and $\Phi$ are the parameters of the detector CNN ($g(\bullet)$) and DoG, the $\{(I_i, y_i)\}_i$ are annotated training image windows and $l(I,y)$ is the negative likelihood loss function. This approach may provide some improvement, and may avoid the onerous task of manual parameters selection. Still, the performances were outperformed by the adaptive normalization approach described herein, where the filter is adjusted to each test image.

As discussed above, utilizing different parameters for different images may improve performance. An experiment was performed where the training set was split into dark and bright images by simply thresholding the mean intensity. Two different CNNs were trained, one for each subset, together with optimizing the parameter values for DoG using Equation (14). The threshold was set to 80 in the experiments.

The relationship between brightness and ideal normalization CNN parameter values was evaluated. Improved performance is obtained on the dark images with larger values of parameters $\sigma_1^{DoG}$ and $\sigma_2^{DoG}$ than values to obtain improved performance on the bright images. It shows that different images need different parameters for DoG. More specifically, at run-time, for each possible image location, it was first tested if the image patch centered on the location was dark or bright. The corresponding CNN was then applied. The experiments indicated that larger values for $\sigma_1^{DoG}$ and $\sigma_2^{DoG}$ performed better on the dark test images. This is consistent with biological observations: when processing darker images, larger receptive fields are used. In particular, predicted filters using the model of Equation (7)

for a set of images were evaluated. The normalizer CNN trained on a dataset with 10 2D Gaussian filters closely behaved like the visual cortex in term of contrast normalization, as it predicted larger kernels for dark images, and smaller ones for bright images.

Some configurations of the systems and methods disclosed herein (e.g., ALCN techniques) were compared against other normalization techniques. Specifically, FIGS. 7-9 compare different contrast normalization techniques for different objects. For DoG, Subtractive LCN, and Divisive LCN, the best parameters were obtained while training the detector, similar to the procedure described for DoG. The systems and methods disclosed herein, when trained from a single real image, consistently outperformed the others on all the objects of a dataset. Adding a few more real images to the training set further improves the performance. As can be observed in FIGS. 7-9, ALCN outperforms other techniques. Also, the other techniques have very different performances across the different objects of the dataset. This further illustrates the benefits of the systems and methods disclosed herein as a general solution for illumination-invariant object detection.

Specifically, FIG. 7 illustrates a graph of PR curves for different techniques. The vertical axis illustrates precision 782 and the horizontal axis illustrates recall 784. PR curves are illustrated for ALCN 786, DoG 788, subtractive LCN 790, divisive LCN 792, CLAHE 794, histogram equalization (HE) 796, intrinsic image 798, and normalization by standardization (GN) 701. AUC values for each of the techniques are also illustrated. As can be observed, ALCN outperforms other techniques.

FIG. 8 is a graph illustrating precision and recall for several object detection techniques for another target object. Specifically, FIG. 8 illustrates a graph of PR curves for different techniques. The vertical axis illustrates precision 882 and the horizontal axis illustrates recall 884. PR curves are illustrated for ALCN 886, DoG 888, subtractive LCN 890, divisive LCN 892, CLAHE 894, histogram equalization (HE) 896, intrinsic image 898, and normalization by standardization (GN) 801. AUC values for each of the techniques are also illustrated. As can be observed, ALCN outperforms other techniques.

FIG. 9 is a graph illustrating precision and recall for several object detection techniques for yet another target object. Specifically, FIG. 9 illustrates a graph of PR curves for different techniques. The vertical axis illustrates precision 982 and the horizontal axis illustrates recall 984. PR curves are illustrated for ALCN 986, DoG 988, CLAHE 994, histogram equalization (HE) 996, intrinsic image 998, and normalization by standardization (GN) 901. AUC values for each of the techniques are also illustrated. As can be observed, ALCN outperforms other techniques.

Figure 10:
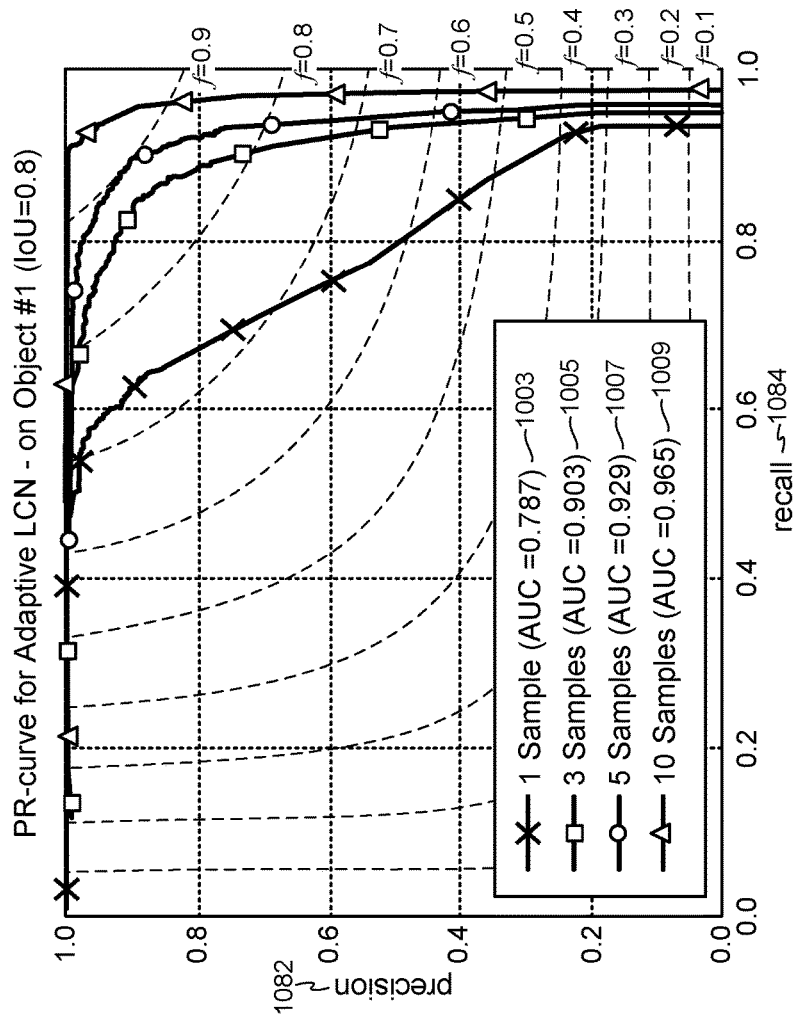
FIG. 10 is a graph illustrating precision and recall of adaptive local contrast normalization (ALCN) for different numbers of training images for a target object.
Figure 11:
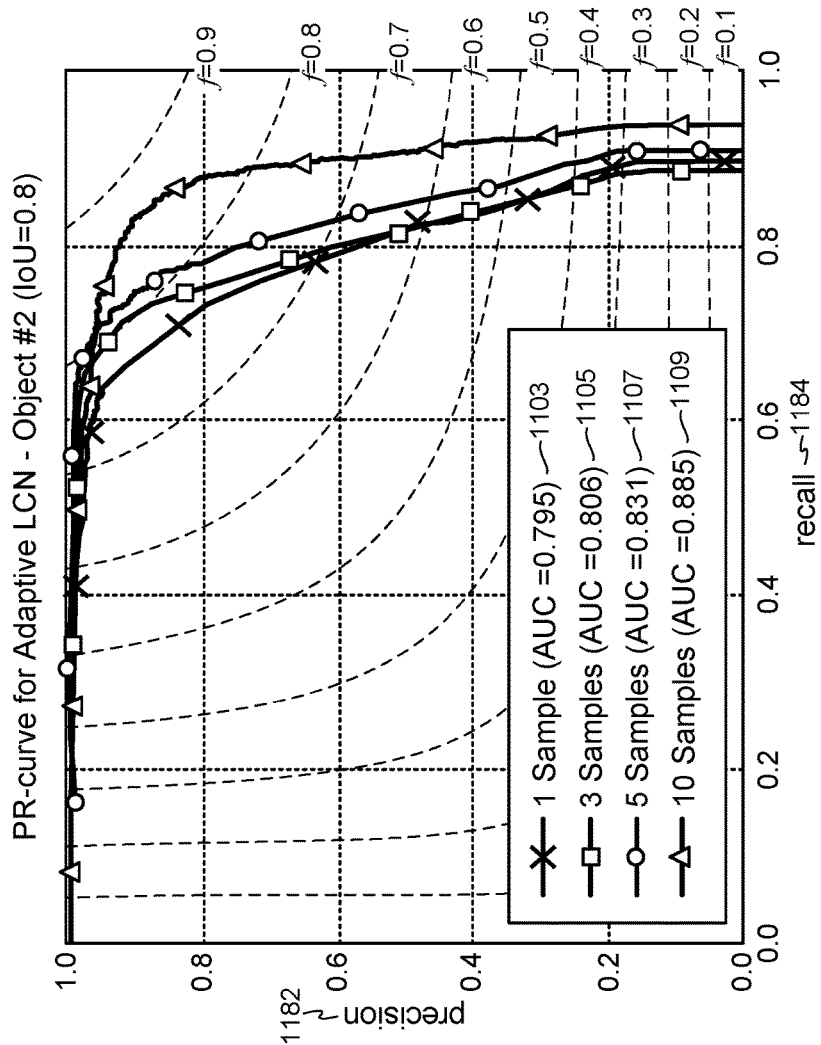
FIG. 11 is a graph illustrating precision and recall of ALCN for different numbers of training images for another target object.
Figure 12:
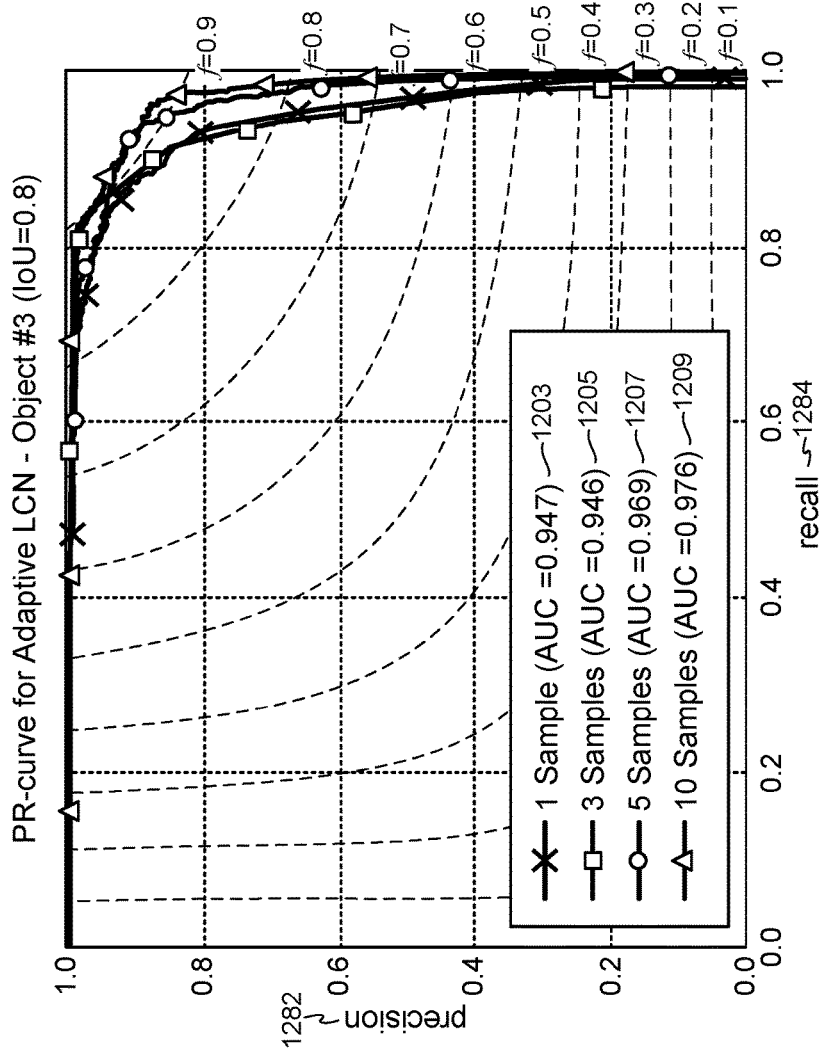
FIG. 12 is a graph illustrating precision and recall of ALCN for different numbers of training images for yet another target object.

FIG. 10 is a graph illustrating precision and recall of ALCN for different numbers of training images (e.g., samples) for a target object. In particular, FIGS. 10-12 illustrate detector performance for different numbers of training images (e.g., real images) used for training. Specifically, FIGS. 10-12 illustrates the influence of the number of real images used for training. As illustrated in FIGS. 10-12, detection accuracy increases when using more real images for generating the training set. Synthetic images were generated from each of these real images to build the full training set. The total number of synthetic training images was kept constant for this evaluation (although numbers of training images may vary in practice).

Specifically, FIG. 10 illustrates a graph of PR curves for different numbers of training images (e.g., samples). The vertical axis illustrates precision 1082 and the horizontal axis illustrates recall 1084. PR curves are illustrated for 1 sample 1003, 3 samples 1005, 5 samples 1007, and 10 samples 1009. Corresponding AUC values are also illustrated. As can be observed, ALCN performance improves with more samples.

Using only 1 image enabled outperformance of other techniques. Even better results were obtained when using more real images. It can be observed that the combination of two CNNs (e.g., normalization CNN and detector CNN) may be trained with very few real examples augmented with synthetic examples. In some configurations, complex illumination effects may not need to be utilized when generating synthetic training images. Only quasi-affine changes may be utilized, in order to make the combination of the normalizer CNN and the detector CNN robust to complex light changes as shadows and specularities.

FIG. 11 is a graph illustrating precision and recall of ALCN for different numbers of training images (e.g., samples) for another target object. Specifically, FIG. 11 illustrates a graph of PR curves for different numbers of training images (e.g., samples). The vertical axis illustrates precision 1182 and the horizontal axis illustrates recall 1184. PR curves are illustrated for 1 sample 1103, 3 samples 1105, 5 samples 1107, and 10 samples 1109. Corresponding AUC values are also illustrated. As can be observed, ALCN performance improves with more samples.

FIG. 12 is a graph illustrating precision and recall of ALCN for different numbers of training images (e.g., samples) for yet another target object. Specifically, FIG. 12 illustrates a graph of PR curves for different numbers of training images (e.g., samples). The vertical axis illustrates precision 1282 and the horizontal axis illustrates recall 1284. PR curves are illustrated for 1 sample 1203, 3 samples 1205, 5 samples 1207, and 10 samples 1209. Corresponding AUC values are also illustrated. As can be observed, ALCN performance improves with more samples.

Figure 13:
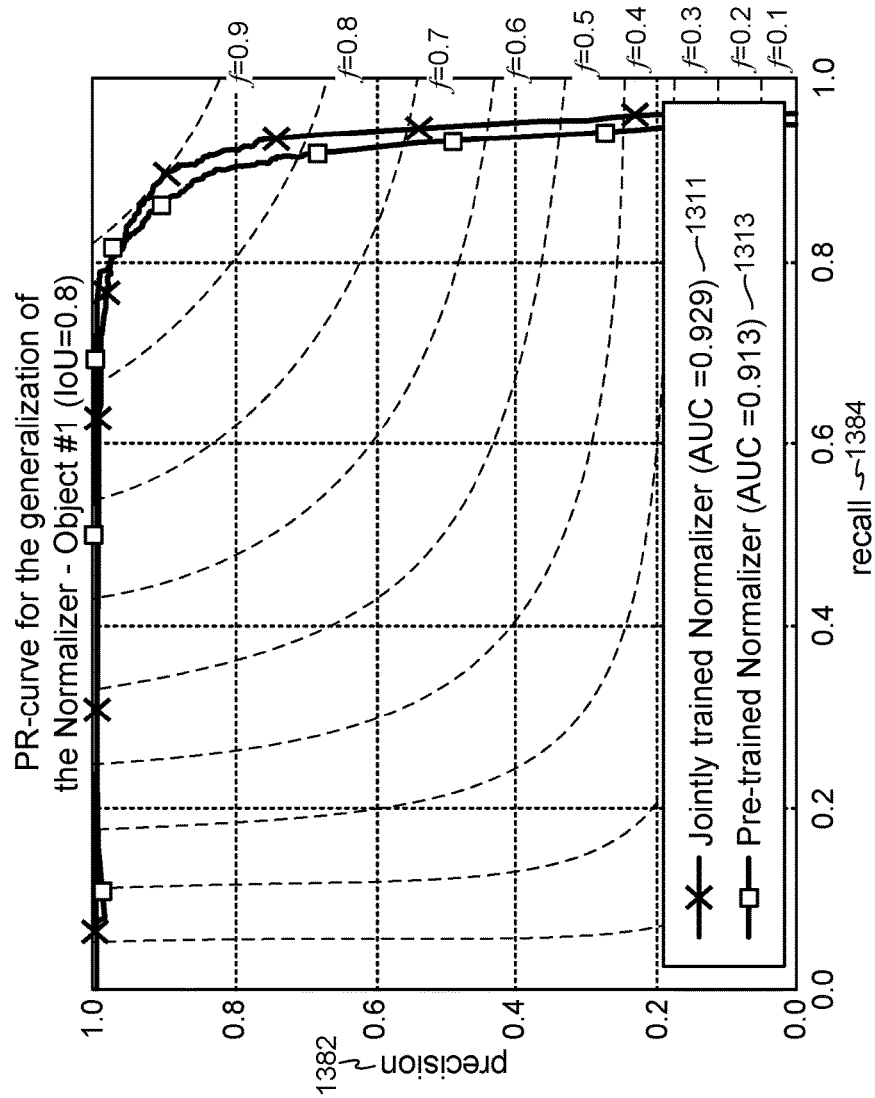
FIG. 13 is a graph illustrating precision and recall of ALCN for a jointly trained normalizer versus a pre-trained normalizer CNN for a target object.

FIG. 13 is a graph illustrating precision and recall of ALCN for a jointly trained normalizer versus a pre-trained normalizer CNN for a target object. The vertical axis illustrates precision 1382 and the horizontal axis illustrates recall 1384. PR curves are illustrated for a jointly trained normalizer CNN 1311 and a pre-trained normalizer CNN 1313. Corresponding AUC values are also illustrated. As can be observed, a pre-trained normalizer CNN may be utilized at almost no loss of accuracy. This approach may avoid re-training the normalizer CNN, which may reduce training time and processing for additional target object detection.

Figure 14:
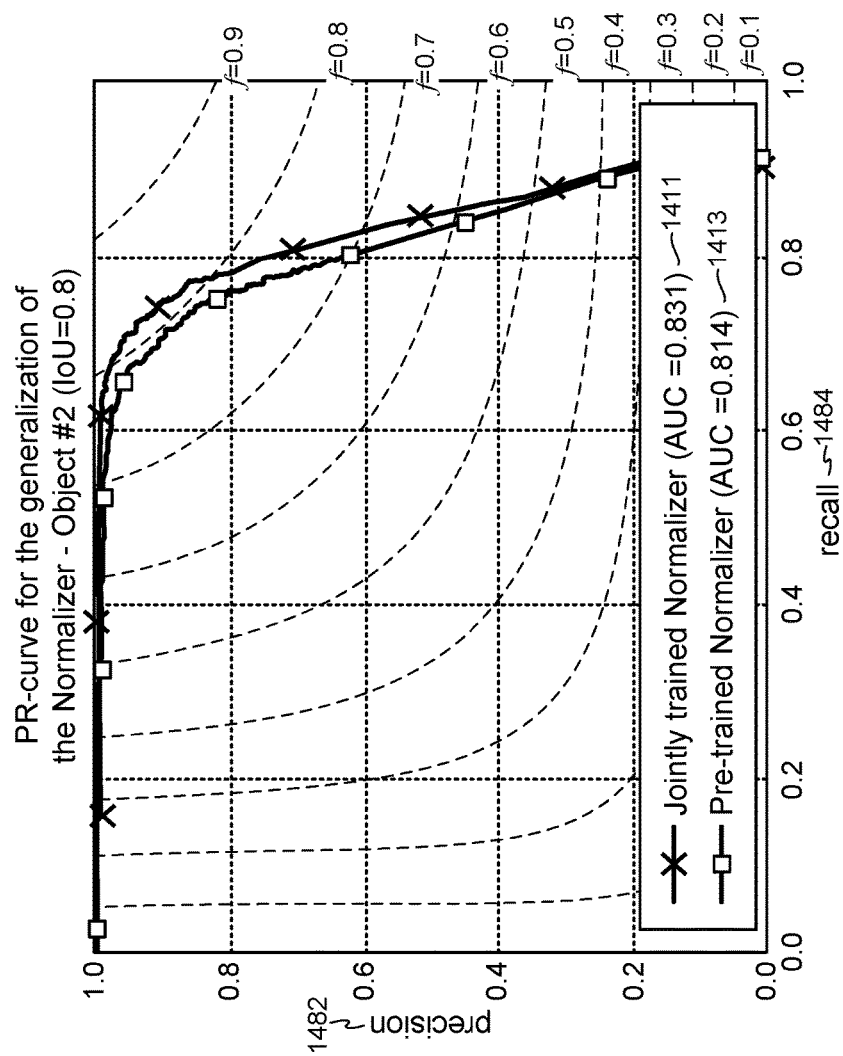
FIG. 14 is a graph illustrating precision and recall of ALCN for a jointly trained normalizer versus a pre-trained normalizer CNN for another target object.
Figure 15:
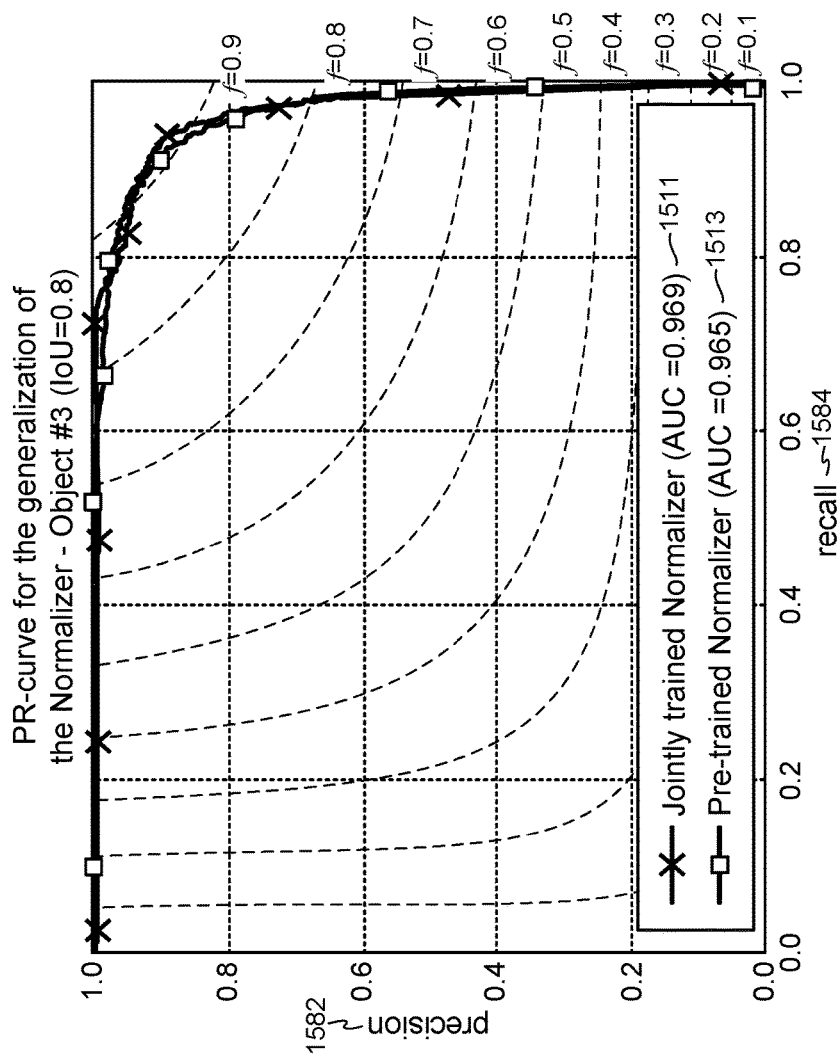
FIG. 15 is a graph illustrating precision and recall of ALCN for a jointly trained normalizer versus a pre-trained normalizer CNN for yet another target object.

As described herein, some configurations of the systems and methods may have a benefit of generalization. For example, the normalizer CNN may generalize well (e.g., may be used effectively regardless of the target object). For evaluation, the normalizer CNN was trained on synthetic images generated from 10 objects of a dataset, and tested on the two first objects of a dataset, given 5 training images for each. More specifically, a dataset was made from 10 objects seen under 15 different illuminations, with 9 images captured under various strengths of uniform illumination, and 6 images under different degrees of nonuniform illumination. FIGS. 13-15 compare the normalizer CNN when it is trained jointly to when it is pre-trained on a dataset. This experiment illustrates that the normalizer CNN may generalize well from a small dataset to unseen objects.

FIG. 14 is a graph illustrating precision and recall of ALCN for a jointly trained normalizer versus a pre-trained normalizer CNN for another target object. The vertical axis illustrates precision 1482 and the horizontal axis illustrates recall 1484. PR curves are illustrated for a jointly trained normalizer CNN 1411 and a pre-trained normalizer CNN 1413. Corresponding AUC values are also illustrated.

FIG. 15 is a graph illustrating precision and recall of ALCN for a jointly trained normalizer versus a pre-trained normalizer CNN for yet another target object. The vertical axis illustrates precision 1582 and the horizontal axis illustrates recall 1584. PR curves are illustrated for a jointly trained normalizer CNN 1511 and a pre-trained normalizer CNN 1513. Corresponding AUC values are also illustrated.

It should be noted that ALCN with object detection was also compared to other object detection techniques. For example, some configurations of the systems and methods disclosed herein (e.g., a deep learning solution) were compared to the Viola-Jones detector and the Deformable Part Model (DPM), which are other techniques for object detection. For the Viola-Jones detector, an OpenCV implementation with Local Binary Patterns and 10 stages were evaluated. The performance on the test dataset was very poor, with an AUC of 0.126 for Viola-Jones versus 0.787 for the systems and methods disclosed herein using a single training image. Moreover, training took one and a half days for Viola-Jones, while it took only less than an hour to jointly train the normalizer CNN and the detector CNN in accordance with the systems and methods disclosed herein. The implementation of DPM did not converge on the problem, perhaps because of the large variation in appearance of the training images.

Some configurations of the systems and methods disclosed herein may be applied to 3D object detection. For example, some configurations of the systems and methods disclosed herein may be applied to 3D object detection in videos. In some configurations, 3D object detection may be performed based on detections of parts.

ALCN was compared to DoG on a video sequence. ALCN performed best for all the selected parts. In particular, the test videos utilized exhibited challenging dynamic complex background and light changes. A dataset was utilized and the normalizer CNN described herein was added to a CNN used for detecting parts. 100,000 32×32 image patches were randomly extracted close to the center of each part—the corners of a box—as positive, with the same number of negative patches. DoG normalization optimized on these training images was evaluated against a generalized normalizer CNN in accordance with the systems and methods disclosed herein (which was pre-trained on a dataset in this case), for four corners of the box. The results illustrated that the pre-trained ALCN normalizer CNN clearly outperforms DoG normalization, which appeared to perform as the second best technique in accordance with the experiments.

The systems and methods disclosed herein may provide one or more powerful approaches to illumination normalization. Some configurations of the systems and methods disclosed herein mimic what is known from the mammal visual system. Additionally or alternatively, some configurations of the systems and methods disclosed herein may be beneficial since the normalizer CNN may be added to a standard CNN to perform more robust object detection.

Figure 16:
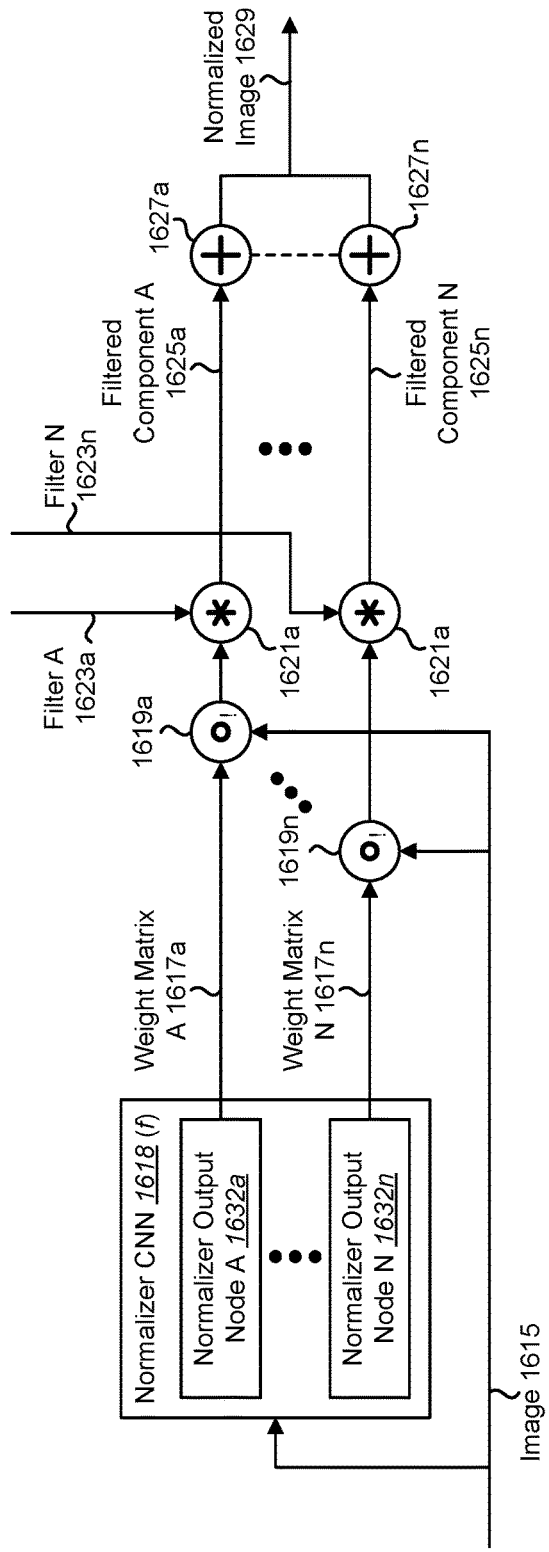
FIG. 16 is a block diagram illustrating an example of an approach for normalizing an entire image.

FIG. 16 is a block diagram illustrating an example of an approach for normalizing an entire image. Specifically, FIG. 16 illustrates an example of a normalizer CNN 1618 (e.g., f). The normalizer CNN 1618 may be one example of the normalizer CNN 118 described in connection with FIG. 1.

One or more of the structures described in connection with FIG. 16 may be implemented in the electronic device 102 described in connection with FIG. 1 in some configurations. Additionally or alternatively, one or more of the functions and/or procedures described in connection with FIG. 16 may be performed as described in connection with one or more of FIGS. 1-6 in some configurations. The structure illustrated in FIG. 16 may be utilized at run-time for normalizing one or more images. The normalized image(s) may be utilized in one or more computer vision applications (e.g., object detection, object tracking, autofocus, etc.).

The normalizer CNN 1618 may receive an image 1615 (e.g., an entire image). The normalizer CNN 1618 may include one or more output nodes A-N 1632*a*-*n* (e.g., neurons). The normalizer CNN 1618 may be utilized to predict weight matrices A-N 1617*a*-*n* (of the ALCN, for example) depending on the image 1615. For example, a weight matrix 1617 may be determined (e.g., assembled, computed, etc.) from weights predicted from the normalizer CNN 1618. Hadamard product operations 1619*a*-*n* may produce Hadamard products of the respective weight matrices 1617*a*-*n* and the input image 1615 (e.g., an entire image). The Hadamard products may be respectively convolved 1621*a*-*n* with filters A-N 1623*a*-*n* (e.g., Gaussian filters) to produce filtered components A-N 1625*a*-*n* (e.g., $I_k^{ALCN}$). The filtered components A-N 1625*a*-*n* may be summed 1627*a*-*n* to produce a normalized image 1629 (e.g., $I^{ALCN}$). One or more of these operations may be performed in accordance with one or more of Equations (9)-(10).

Figure 17:
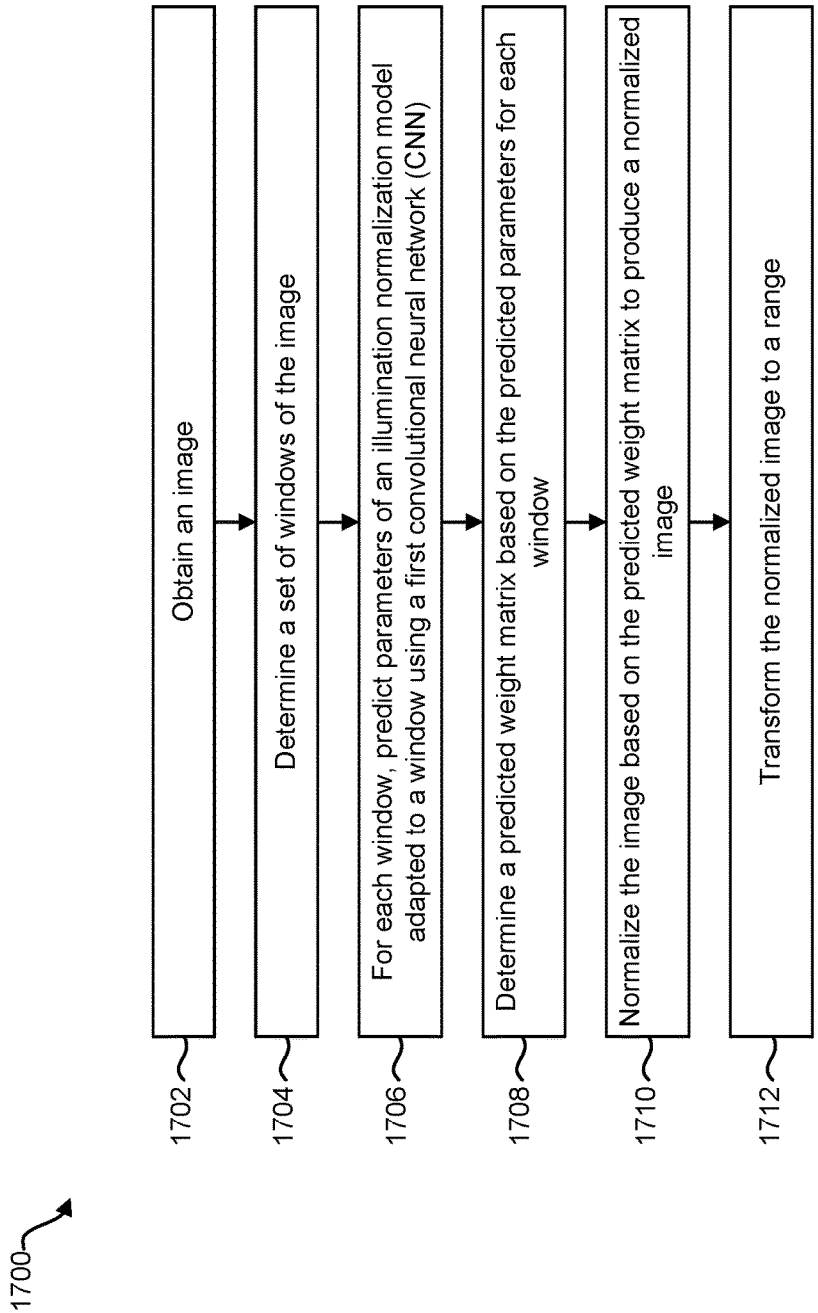
FIG. 17 is a flow diagram illustrating one configuration of a method for normalizing an image.

FIG. 17 is a flow diagram illustrating one configuration of a method 1700 for normalizing an image (e.g., an entire image). The method 1700 may be performed by an electronic device (e.g., the electronic device 102 described in connection with FIG. 1).

The electronic device 102 may obtain 1702 an image. This may be accomplished as described in connection with FIG. 1. For example, the electronic device 102 may capture one or more images with one or more image sensors 104 and/or may receive one or more images from one or more remote devices.

The electronic device 102 may determine 1704 a set of windows of the image. This may be accomplished as described in connection with one or more of FIGS. 1-4. For example, the electronic device 102 may utilize a sliding window approach to determine 1704 the set of windows. For instance, each window may be a subset of the image. The windows may or may not overlap. The windows may be of uniform size or varying size.

The electronic device 102 may (for each window of the set of windows) predict 1706 parameters of an illumination normalization model adapted to a window using a first CNN (e.g., normalizer CNN). This may be accomplished as described in connection with one or more of FIGS. 1-4. It should be noted that the parameters may be different for two or more of the windows. In some configurations, the parameters may be weights for filters (e.g., Gaussian filters).

The electronic device 102 may determine 1708 a predicted weight matrix based on the predicted parameters for each window. This may be accomplished as described in connection with one or more of FIGS. 1 and 16. For example, the electronic device 102 may assemble the predicted weight matrix with predicted weights from the normalizer CNN. In some configurations, this may be accomplished in accordance with Equation (10). In some configurations, the electronic device 102 may determine 1708 multiple weight matrices corresponding to each filter (e.g., Gaussian filter).

The electronic device 102 may normalize 1710 the image based on the predicted weight matrix (e.g., predicted weight matrices) to produce a normalized image. This may be accomplished as described in connection with one or more of FIGS. 1 and 16. For example, the electronic device 102 may determine one or more Hadamard products of one or more weight matrices and the image. The Hadamard products may be convolved with filters and summed to produce the normalized image. In some configurations, this may be accomplished in accordance with Equation (9).

In some configurations, the electronic device 102 may optionally transform 1712 the normalized image (e.g., intensity values) into a range. This may be accomplished as described in connection with FIG. 1. For example, the electronic device 102 may transform 1712 to a range for grayscale images (e.g., (0, 255)). Transforming 1712 the intensity values to a range may enable the normalized image to be used for some computer vision applications.

The normalized (e.g., normalized and transformed image) may be presented on a display. Additionally or alternatively, one or more normalized images may be provided to a computer vision application (for detecting an object, autofocus, auto-zoom, object tracking, object identification, object recognition, etc.).

Figure 18:
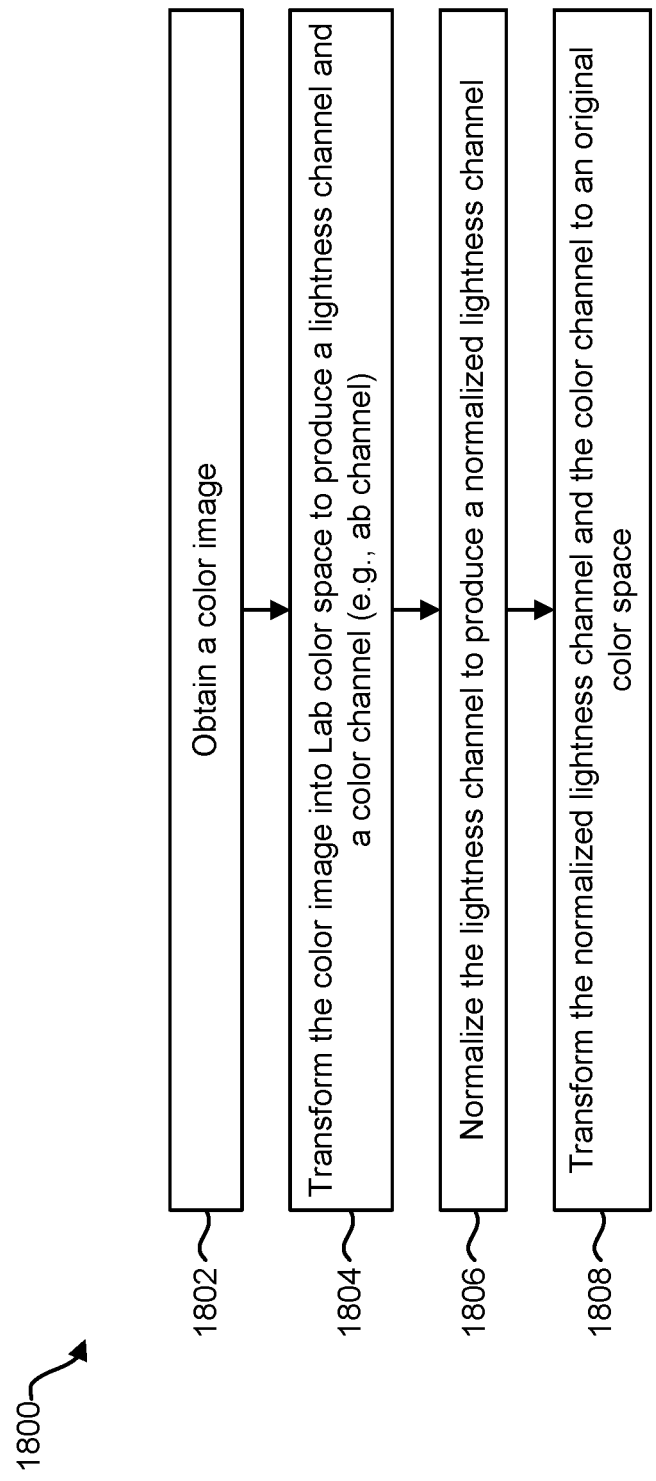
FIG. 18 is a flow diagram illustrating one configuration of a method for normalizing a color image.

FIG. 18 is a flow diagram illustrating one configuration of a method 1800 for normalizing a color image. The method 1800 may be performed by an electronic device (e.g., the electronic device 102 described in connection with FIG. 1).

The electronic device 102 may obtain 1802 a color image. This may be accomplished as described in connection with FIG. 1. For example, the electronic device 102 may capture one or more images with one or more image sensors 104 and/or may receive one or more images from one or more remote devices.

The electronic device 102 may transform 1804 the color image to produce a lightness channel (e.g., L) and a color channel (e.g., $\mathbb{I}_{ab}$). This may be accomplished as described in connection with FIG. 1. In some configurations, the color image may be transformed 1804 into Lab color space.

The electronic device 102 may normalize 1806 the lightness channel to produce a normalized lightness channel. This may be accomplished as described in connection with one or more of FIGS. 1-4 and 15-16. For example, the electronic device 102 may normalize the lightness channel as an entire image as described in connection with one or more of FIGS. 1-4 and 15-16. In some configurations, this may be accomplished as described in connection with one or more of Equations (9)-(11).

The electronic device 102 may transform 1808 the normalized lightness channel and the color channel into an original color space. This may be accomplished as described in connection with FIG. 1. For example, the electronic device 102 may transform (e.g., retransform) the image into RGB space without changing the color channel. In some configurations, this may be accomplished in accordance with Equation (12).

The normalized (e.g., normalized and retransformed color image) may be presented on a display. Additionally or alternatively, one or more normalized images may be provided to a computer vision application (for detecting an object, autofocus, auto-zoom, object tracking, object identification, object recognition, etc.).

Figure 19:
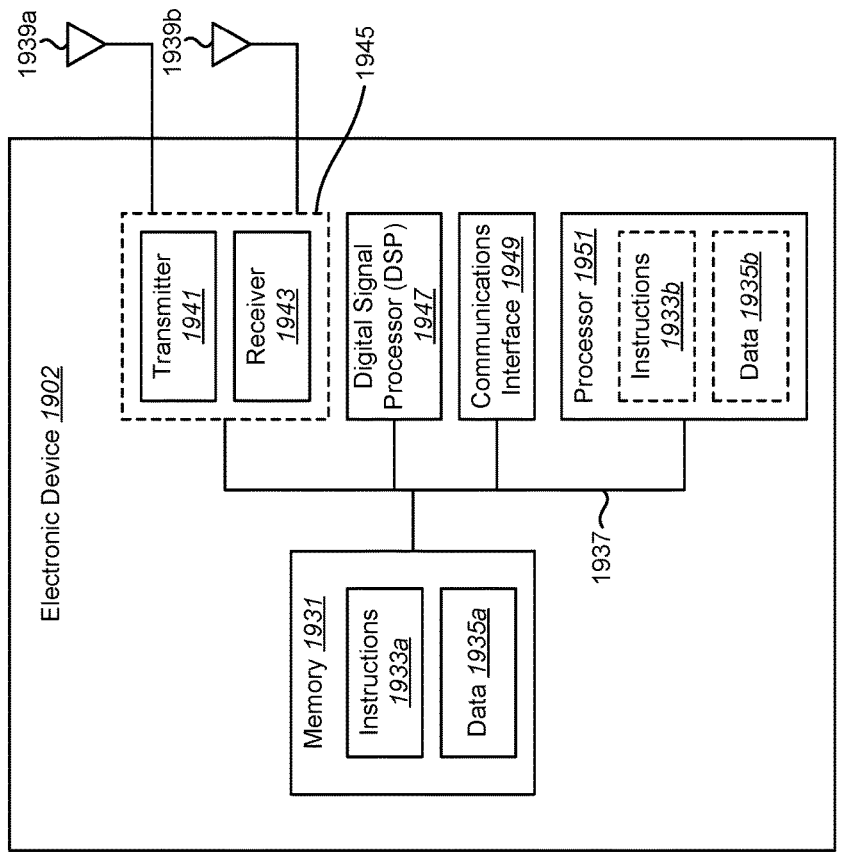
FIG. 19 illustrates certain components that may be included within an electronic device configured to implement various configurations of the systems and methods disclosed herein.

FIG. 19 illustrates certain components that may be included within an electronic device 1902 configured to implement various configurations of the systems and methods disclosed herein. The electronic device 1902 may be an access terminal, a mobile station, a user equipment (UE), a smartphone, a digital camera, a video camera, a tablet device, a laptop computer, a desktop computer, a server, etc. The electronic device 1902 may be implemented in accordance with the electronic device 102 described herein. The electronic device 1902 includes a processor 1951. The processor 1951 may be a general purpose single- or multi-chip microprocessor (e.g., an ARM), a special purpose microprocessor (e.g., a digital signal processor (DSP)), a microcontroller, a programmable gate array, etc. The processor 1951 may be referred to as a central processing unit (CPU). Although just a single processor 1951 is shown in the electronic device 1902, in an alternative configuration, a combination of processors (e.g., an ARM and DSP) could be implemented.

The electronic device 1902 also includes memory 1931. The memory 1931 may be any electronic component capable of storing electronic information. The memory 1931 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1935a and instructions 1933a may be stored in the memory 1931. The instructions 1933a may be executable by the processor 1951 to implement one or more of the methods 200, 400, 600, 1700, 1800 described herein. Executing the instructions 1933a may involve the use of the data 1935a that is stored in the memory 1931. When the processor 1951 executes the instructions 1933, various portions of the instructions 1933b may be loaded onto the processor 1951 and/or various pieces of data 1935b may be loaded onto the processor 1951.

The electronic device 1902 may also include a transmitter 1941 and a receiver 1943 to allow transmission and reception of signals to and from the electronic device 1902. The transmitter 1941 and receiver 1943 may be collectively referred to as a transceiver 1945. One or more antennas 1939a-b may be electrically coupled to the transceiver 1945. The electronic device 1902 may also include (not shown) multiple transmitters, multiple receivers, multiple transceivers and/or additional antennas.

The electronic device 1902 may include a digital signal processor (DSP) 1947. The electronic device 1902 may also include a communications interface 1949. The communications interface 1949 may allow and/or enable one or more kinds of input and/or output. For example, the communications interface 1949 may include one or more ports and/or communication devices for linking other devices to the electronic device 1902. In some configurations, the communications interface 1949 may include the transmitter 1941, the receiver 1943, or both (e.g., the transceiver 1945). Additionally or alternatively, the communications interface 1949 may include one or more other interfaces (e.g., touchscreen, keypad, keyboard, microphone, camera, etc.). For example, the communication interface 1949 may enable a user to interact with the electronic device 1902.

The various components of the electronic device 1902 may be coupled together by one or more buses, which may include a power bus, a control signal bus, a status signal bus, a data bus, etc. For the sake of clarity, the various buses are illustrated in FIG. 19 as a bus system 1937.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. A method for normalizing an image by an electronic device, the method comprising:
   obtaining an image comprising a target object;
   determining a set of windows of the image;
   for each window of the set of windows of the image:
      predicting parameters of an illumination normalization model adapted to the window using a first convolutional neural network (CNN), wherein the parameters comprise a set of weights for combining filters; and
      applying the illumination normalization model to the window to produce a normalized window.

2. The method of claim 1, further comprising, for each window of the set of windows of the image, analyzing the normalized window with a second CNN for scoring the normalized window.

3. The method of claim 2, wherein the first CNN and the second CNN are jointly trained CNNs.

4. The method of claim 2, further comprising detecting the target object in a normalized window with a largest score.

5. The method of claim 2, wherein the first CNN is a normalizer CNN and the second CNN is a detector CNN.

6. The method of claim 2, wherein the first CNN is trained for predicting parameters of the illumination normalization model based on a set of training images, wherein a subset of the set of training images comprises a training target object, and wherein the second CNN is trained for detecting the training target object based on the set of training images and the illumination normalization model.

7. The method of claim 2, wherein the first CNN and the second CNN are trained based on minimizing a joint loss function.

8. The method of claim 1, wherein predicting the parameters comprises predicting the set of weights respectively applied to a set of Gaussian filters to obtain a convolutional filter.

9. The method of claim 1, wherein applying the illumination normalization model to the window comprises convolving a convolutional filter with the window.

10. The method of claim 1, further comprising:
determining a predicted weight matrix based on the predicted parameters for each window; and
normalizing the image based on the predicted weight matrix to produce a normalized image.

11. The method of claim 1, wherein the image is a color image, and wherein the method further comprises:
transforming the color image to produce a lightness channel and a color channel;
normalizing the lightness channel to produce a normalized lightness channel; and
transforming the normalized lightness channel and the color channel to the original color space.

12. An electronic device for normalizing an image, comprising:
a processor configured to:
obtain an image comprising a target object;
determine a set of windows of the image;
for each window of the set of windows of the image:
predict parameters of an illumination normalization model adapted to the window using a first convolutional neural network (CNN), wherein the parameters comprise a set of weights for combining filters; and
apply the illumination normalization model to the window to produce a normalized window.

13. The electronic device of claim 12, wherein the processor is configured to, for each window of the set of windows of the image, analyze the normalized window with a second CNN to score the normalized window.

14. The electronic device of claim 13, wherein the first CNN and the second CNN are jointly trained CNNs.

15. The electronic device of claim 13, wherein the processor is configured to detect the target object in a normalized window with a largest score.

16. The electronic device of claim 13, wherein the first CNN is a normalizer CNN and the second CNN is a detector CNN.

17. The electronic device of claim 13, wherein the first CNN is trained for predicting parameters of the illumination normalization model based on a set of training images, wherein a subset of the set of training images comprises a training target object, and wherein the second CNN is trained for detecting the training target object based on the set of training images and the illumination normalization model.

18. The electronic device of claim 13, wherein the first CNN and the second CNN are trained based on minimizing a joint loss function.

19. The electronic device of claim 12, wherein the processor is configured to predict the set of weights respectively applied to a set of Gaussian filters to obtain a convolutional filter.

20. The electronic device of claim 12, wherein the processor is configured to convolve a convolutional filter with the window.

21. The electronic device of claim 12, wherein the processor is configured to:
determine a predicted weight matrix based on the predicted parameters for each window; and
normalize the image based on the predicted weight matrix to produce a normalized image.

22. The electronic device of claim 12, wherein the image is a color image, and wherein the processor is configured to:
transform the color image to produce a lightness channel and a color channel;
normalize the lightness channel to produce a normalized lightness channel; and
transform the normalized lightness channel and the color channel to the original color space.

23. An apparatus for normalizing an image, comprising:
means for obtaining an image comprising a target object;
means for determining a set of windows of the image;
means for predicting, for each window of the set of windows of the image, parameters of an illumination normalization model adapted to the window using a first convolutional neural network (CNN), wherein the parameters comprise a set of weights for combining filters; and
means for applying, for each window of the set of windows of the image, the illumination normalization model to the window to produce a normalized window.

24. The apparatus of claim 23, further comprising, means for analyzing, for each window of the set of windows of the image, the normalized window with a second CNN for scoring the normalized window.

25. The apparatus of claim 24, wherein the first CNN and the second CNN are jointly trained CNNs.

26. The apparatus of claim 23, wherein the image is a color image, and wherein the apparatus further comprises:
means for transforming the color image to produce a lightness channel and a color channel;
means for normalizing the lightness channel to produce a normalized lightness channel; and
means for transforming the normalized lightness channel and the color channel to the original color space.

27. A computer-program product for normalizing an image, comprising a non-transitory computer-readable medium having instructions thereon, the instructions comprising:
code for causing an electronic device to obtain an image comprising a target object;
code for causing the electronic device to determine a set of windows of the image;
code for causing the electronic device to predict, for each window of the set of windows of the image, parameters of an illumination normalization model adapted to the window using a first convolutional neural network (CNN), wherein the parameters comprise a set of weights for combining filters; and
code for causing the electronic device to apply, for each window of the set of windows of the image, the illumination normalization model to the window to produce a normalized window.

28. The computer-program product of claim 27, wherein the instructions further comprise code for causing the electronic device to analyze, for each window of the set of windows of the image, the normalized window with a second CNN for scoring the normalized window.

29. The computer-program product of claim 28, wherein the first CNN and the second CNN are jointly trained CNNs.

30. The computer-program product of claim 27, wherein the image is a color image, and wherein the instructions further comprise:
code for causing the electronic device to transform the color image to produce a lightness channel and a color channel;

code for causing the electronic device to normalize the lightness channel to produce a normalized lightness channel; and code for causing the electronic device to transform the normalized lightness channel and the color channel to the original color space.

* * * * *